United States Patent
Teramoto et al.

(10) Patent No.: US 9,914,844 B2
(45) Date of Patent: Mar. 13, 2018

(54) INK COMPOSITION

(71) Applicant: Seiko Epson Corporation, Tokyo (JP)

(72) Inventors: Ryosuke Teramoto, Matsumoto (JP); Hiromi Ohori, Gifu (JP); Yuho Miyake, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 178 days.

(21) Appl. No.: 14/928,745

(22) Filed: Oct. 30, 2015

(65) Prior Publication Data
US 2016/0122565 A1 May 5, 2016

(30) Foreign Application Priority Data
Nov. 5, 2014 (JP) .................. 2014-225371

(51) Int. Cl.
*C09D 11/328* (2014.01)
*C09D 11/38* (2014.01)

(52) U.S. Cl.
CPC ............ C09D 11/328 (2013.01); C09D 11/38 (2013.01)

(58) Field of Classification Search
CPC ............................. C09D 11/328; C09D 11/38
USPC ....................................... 106/31.5
See application file for complete search history.

(56) References Cited

U.S. PATENT DOCUMENTS

| | | | | |
|---|---|---|---|---|
| 6,923,855 | B2 * | 8/2005 | Harada | C09D 11/328 106/31.5 |
| 7,510,605 | B2 * | 3/2009 | Harada | C09D 11/328 106/31.48 |
| 8,808,440 | B2 * | 8/2014 | Fujie | C09D 11/328 106/31.5 |
| 8,932,394 | B2 * | 1/2015 | Kudo | C09D 11/38 106/31.5 |
| 9,587,129 | B2 * | 3/2017 | Miyake | C09D 11/328 |
| 9,676,951 | B2 * | 6/2017 | Miyake | C09D 11/328 |
| 2008/0145561 | A1 * | 6/2008 | Kitamura | C09D 11/40 106/31.48 |
| 2008/0274285 | A1 * | 11/2008 | Okamura | C09D 11/328 106/31.48 |
| 2011/0091696 | A1 * | 4/2011 | Tanaka | C09D 11/38 428/195.1 |
| 2013/0284064 | A1 * | 10/2013 | Tateishi | C09D 11/328 106/31.78 |
| 2014/0238264 | A1 | 8/2014 | Fujie et al. | |
| 2016/0032125 | A1 * | 2/2016 | Ohori | C09D 11/328 106/31.48 |

FOREIGN PATENT DOCUMENTS

JP     2013-122039 A     6/2013

OTHER PUBLICATIONS

European Search Report for corresponding European Application EP 3018179 dated Jan. 21, 2016; 2 pages.*

* cited by examiner

*Primary Examiner* — Helene Klemanski
(74) *Attorney, Agent, or Firm* — Nutter McClennen & Fish LLP; John J. Penny, Jr.; Alex Nagomiy

(57) ABSTRACT

There is provided an ink composition, including: a combination of specific dyes, in which the dynamic contact angle of the ink to a silicon wafer is 24° or lower at 100 msec after dropping, and is 9° or lower at 5,100 msec after dropping.

9 Claims, No Drawings

INK COMPOSITION

BACKGROUND

1. Technical Field

The present invention relates to an ink composition.

2. Related Art

Ink jet recording methods can record high-definition images by a relatively simple apparatus, and have been rapidly developed in many areas. Among these methods, various examinations for images of records to be obtained have been conducted. For example, for the purpose of providing a coloring composition having good fastness to ozone gas and high print density, JP-A-2013-122039 discloses a coloring composition containing two kinds of predetermined phthalocyanine dyes.

An ink composition fills various ink containers, such as a cartridge, a pack, and a large-capacity tank, and is then used. Thus, with the expansion of ink usage, an ink composition excellent in high reliability (initial filling properties and (intermittent) printing stability) in addition to light resistance is desired.

SUMMARY

An advantage of some aspects of the invention is to provide an ink composition excellent in initial filling properties and (intermittent) printing stability in addition to light resistance.

The present inventors have conducted intensive studies. As a result, they have found that the above problems can be solved by using a predetermined amount of a predetermined dye, thus completing the invention.

That is, the invention is as follows.

[1] According to an aspect of the invention, there is provided an ink composition, including: a dye (Y-1) represented by a formula below; and a dye (Y-2) selected from the group consisting of C.I. Direct Yellows 86, 132, and 142, in which the content ratio A of the dye (Y-1) and the dye (Y-2) (the dye (Y-1):the dye (Y-2)) is 7:3 to 9.5:0.5, the content of the dye (Y-1) is 2.0 mass % to 5.0 mass %, and the dynamic contact angle of the composition to a silicon wafer is 24° or lower at 100 msec after dropping, and is 9° or lower at 5,100 msec after dropping, (Y-1)

(in Formula (Y-1), $R_4$ represents a substituent, $R_5$ represents —$OR_6$ or —$NHR_7$, each of $R_6$ and $R_7$ represents a hydrogen atom or a substituent, $X_3$ represents a divalent linking group, n0 is 0 or 1, $Ar_3$ represents a divalent heterocyclic group, and $Ar_4$ represents an alkyl group, an aryl group, or a triazine group).

[2] In the ink composition according to [1], the content of the dye (Y-2) may be 0.10 mass % to 1.0 mass %.

[3] The ink composition according to [1] or [2] may include a dye (Y-3) represented by a formula below, in which the content of the dye (Y-3) is 0.50 mass % to 1.5 mass %,

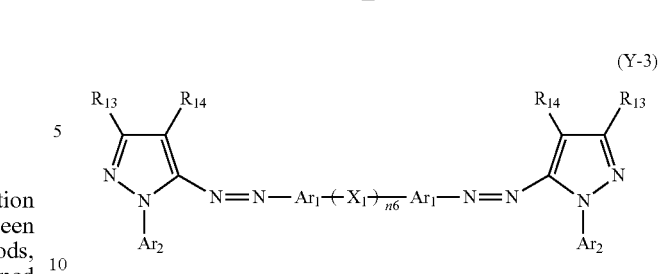

(Y-3)

(in Formula (Y-3), $R_{13}$'s each independently represent a hydrogen atom or a substituent, $R_{14}$'s each independently represent —$OR_{16}$, —$NHR_{17}$, or a cyano group, each of $R_{16}$ and $R_{17}$ represents a hydrogen atom or a substituent, $X_1$ represents a substituted or unsubstituted aryl group or a substituted or unsubstituted triazine group, n6 is 0 or 1, $Ar_1$'s each independently represent a divalent heterocyclic group, and $Ar_2$'s each independently represent a substituted or unsubstituted alkyl group, a substituted or unsubstituted aryl group, or a substituted or unsubstituted triazine group).

[4] The ink composition according to any one of [1] to [3] may include: an alkylene oxide adduct of an acetylene glycol having a main chain of 12 or more carbon atoms; and an acetylene glycol having a main chain of 10 or more carbon atoms.

[5] The ink composition according to any one of [1] to [4] may include polyoxyalkylene alkyl ether.

[6] The ink composition according to any one of [1] to [5] may include triethylene glycol alkyl ether.

[7] In the ink composition according to [6], the mass ratio of the triethylene glycol alkyl ether to the polyoxyalkylene alkyl ether may be 2 or more.

[8] In the ink composition according to any one of [5] to [7], the content of the polyoxyalkylene alkyl ether may be 1.0 mass % to 5.0 mass %.

[9] In the ink composition according to any one of [6] to [8], the content of the triethylene glycol alkyl ether may be 3.0 mass % to 15 mass %.

[10] In the ink composition according to any one of [6] to [9], the triethylene glycol alkyl ether may include triethylene glycol monobutyl ether.

DESCRIPTION OF EXEMPLARY EMBODIMENTS

Hereinafter, an embodiment of the invention (hereinafter, referred to as "present embodiment") will be described in detail, but the invention is not limited thereto. Various modifications can be made within the scope not departing from the gist thereof.

Ink Composition

The ink composition according to the present embodiment includes: a dye (Y-1) represented by a formula below; and a dye (Y-2) selected from the group consisting of C.I. Direct Yellows 86, 132, and 142, in which the content ratio A of the dye (Y-1) and the dye (Y-2) (the dye (Y-1):the dye (Y-2)) is 7:3 to 9.5:0.5, the content of the dye (Y-1) is 2.0 mass % to 5.0 mass %, and the dynamic contact angle of the composition to a silicon wafer is 24° or lower at 100 msec after dropping, and is 9° or lower at 5,100 msec after dropping.

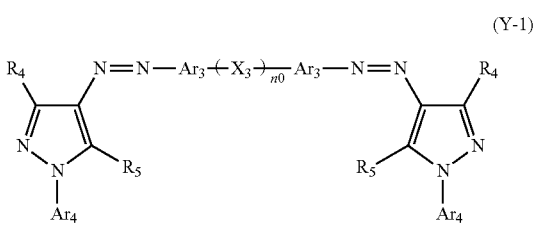

(Y-1)

(In Formula (Y-1), $R_4$ represents a substituent, $R_5$ represents $-OR_6$ or $-NHR_7$, each of $R_6$ and $R_7$ represents a hydrogen atom or a substituent, $X_3$ represents a divalent linking group, n0 is 0 or 1, $Ar_3$ represents a divalent heterocyclic group, and $Ar_4$ represents an alkyl group, an aryl group, or a triazine group.)

Substituent Group A

First, substituent group A and ionic hydrophilic groups will be defined.

The substituent group A are not particularly limited, but examples thereof include a halogen atom, an alkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, sulfamoylamino group, an alkyl or aryl sulfonylamino group, a mercapto group, an alkylthio group, an arylthio group, a heterocyclic thio group, a sulfamoyl group, an alkyl or aryl sulfinyl group, an alkyl or aryl sulfonyl group, an acyl group, an aryloxycarbonyl group, an alkoxycarbonyl group, a carbamoyl group, an aryl or heterocyclic azo group, an imide group, a phosphino group, a phosphinyl group, a phosphinyloxy group, a phosphinylamino group, a silyl group, a sulfonamide group, and an ionic hydrophilic group. These substituents may be further substituted. As the further substituted substituent, a group selected from the above-described substituent group A can be exemplified.

More specifically, examples of the halogen atom include a fluorine atom, a chlorine atom, a bromine atom, and an iodine atom.

As the alkyl group, a linear, branched, or cyclic substituted or unsubstituted alkyl group is exemplified. Examples of the alkyl group include a cycloalkyl group, a bicycloalkyl group, and a tricyclo structure having many cyclic structures. Among the substituents to be described below, an alkyl group (for example, an alkoxy group or an alkyl group of an alkylthio group) also represents the alkyl group of such a concept. Specifically, the alkyl group is preferably an alkyl group having 1 to 30 carbon atoms, and examples thereof include a methyl group, an ethyl group, an n-propyl group, an i-propyl group, a t-butyl group, an n-octyl group, an eicosyl group, a 2-chloroethyl group, a 2-cyanoethyl group, and a 2-ethylhexyl group. The cycloalkyl group is preferably a substituted or unsubstituted cycloalkyl group having 3 to 30 carbon atoms, and examples thereof include a cyclohexyl group, a cyclopentyl group, and a 4-n-dodecyl cyclohexyl group. The bicycloalkyl group is preferably a substituted or unsubstituted bicycloalkyl group having 5 to 30 carbon atoms, that is, a monovalent group obtained by removing one hydrogen atom from a bicycloalkane having 5 to 30 carbon atoms, and examples thereof include a bicyclo[1,2,2]heptan-2-yl group and a bicyclo[2,2,2]octan-3-yl group.

As the aralkyl group, a substituted or unsubstituted aralkyl group is exemplified. The substituted or unsubstituted aralkyl group is preferably an aralkyl group having 7 to 30 carbon atoms. Examples thereof include a benzyl group and a 2-phenethyl group.

As the alkenyl group, a linear, branched, or cyclic substituted or unsubstituted alkenyl group is exemplified. Examples of the alkenyl group include a cycloalkenyl group and a bicycloalkenyl group. Specifically, the alkenyl group is preferably a substituted or unsubstituted alkenyl group having 2 to 30 carbon atoms, and examples thereof include a vinyl group, an allyl group, a prenyl group, a geranyl group, and an oleyl group. The cycloalkenyl group is preferably a substituted or unsubstituted cycloalkenyl having 3 to 30 carbon atoms, that is, a monovalent group obtained by removing one hydrogen atom from a cycloalkene having 3 to 30 carbon atoms, and examples thereof include a 2-cyclopenten-1-yl group and a 2-cyclohexen-1-yl group. The bicycloalkenyl group is a substituted or unsubstituted bicycloalkenyl group, and preferably a substituted or unsubstituted bicycloalkenyl group having 5 to 30 carbon atoms, that is, a monovalent group obtained by removing one hydrogen atom from a bicycloalkene having one double bond, and examples thereof include a bicyclo[2,2,1]hept-2-en-1-yl group and a bicyclo[2,2,2]oct-2-en-4-yl group.

The alkynyl group is preferably a substituted or unsubstituted alkynyl group having 2 to 30 carbon atoms, and examples thereof include an ethynyl group, a propargyl group, and a trimethylsilyl ethynyl group.

The aryl group is preferably a substituted or unsubstituted aryl group having 6 to 30 carbon atoms, and examples thereof include a phenyl group, a p-tolyl group, a naphthyl group, an m-chlorophenyl group, and an o-hexadecanoylaminophenyl group.

The heterocyclic group is preferably a monovalent group obtained by removing one hydrogen atom from a 5- or 6-membered substituted or unsubstituted aromatic or non-aromatic heterocyclic compound, and more preferably a 5- or 6-membered aromatic heterocyclic group having 3 to 30 carbon atoms, and examples thereof include a 2-furyl group, a 2-thienyl group, a 2-pyrimidinyl group, and a 2-benzothiazolyl group.

The alkoxy group is preferably a substituted or unsubstituted alkoxy group having 1 to 30 carbon atoms, and examples thereof include a methoxy group, an ethoxy group, an isopropoxy group, a t-butoxy group, an n-octyloxy group, and a 2-methoxyethoxy group.

The aryloxy group is preferably a substituted or unsubstituted aryloxy group having 6 to 30 carbon atoms, and examples thereof include a phenoxy group, a 2-methylphenoxy group, a 4-t-butylphenoxy group, a 3-nitrophenoxy group, and a 2-tetradecanoylaminophenoxy group.

The silyloxy group is preferably a substituted or unsubstituted silyloxy group having 0 to 20 carbon atoms, and examples thereof include a trimethylsilyloxy group and a diphenylmethylsilyloxy group.

The heterocyclic oxy group is preferably a substituted or unsubstituted heterocyclic oxy group having 2 to 30 carbon atoms, and examples thereof include a 1-phenyltetrazole-5-oxy group and a 2-tetrahydropyranyloxy group.

The acyloxy group is preferably a formyloxy group, a substituted or unsubstituted alkylcarbonyloxy group having 2 to 30 carbon atoms, or a substituted or unsubstituted arylcarbonyloxy group having 6 to 30 carbon atoms, and examples thereof include an acetyloxy group, a pivaloyloxy group, a stearoyloxy group, a benzoyloxy group, and a p-methoxyphenyl carbonyloxy group.

The carbamoyloxy group is preferably a substituted or unsubstituted carbamoyloxy group having 1 to 30 carbon atoms, and examples thereof include an N,N-dimethylcarbamoyloxy group, an N,N-diethylcarbamoyloxy group, a morpholinocarbonyloxy group, an N, N-di-n-octylaminocarbonyloxy group, and an N-n-octylcarbamoyloxy group.

The alkoxycarbonyloxy group is preferably a substituted or unsubstituted alkoxycarbonyloxy group having 2 to 30 carbon atoms, and examples thereof include a methoxycarbonyloxy group, an ethoxycarbonyloxy group, a t-butoxycarbonyloxy group, and an n-octylcarbonyloxy group.

The aryloxycarbonyloxy group is preferably a substituted or unsubstituted aryloxycarbonyloxy group having 7 to 30 carbon atoms, and examples thereof include a phenoxycarbonyloxy group, a p-methoxyphenoxycarbonyloxy group, and a p-n-hexadecyloxyphenoxycarbonyloxy group.

The amino group is an alkylamino group, an arylamino group, or a heterocyclic amino group, and is preferably an amino group, a substituted or unsubstituted alkylamino group having 1 to 30 carbon atoms, or a substituted or unsubstituted anilino group having 6 to 30 carbon atoms, and examples thereof include a methylamino group, a dimethylamino group, an anilino group, an N-methyl-anilino group, a diphenylamino group, and a triazinylamino group.

The acylamino group is preferably a formylamino group, a substituted or unsubstituted alkylcarbonylamino group having 1 to 30 carbon atoms, or a substituted or unsubstituted arylcarbonylamino group having 6 to 30 carbon atoms, and examples thereof include an acetylamino group, a pivaloylamino group, a lauroylamino group, a benzoylamino group, and a 3,4,5-tri-n-octyloxyphenylcarbonylamino group.

The amino carbonyl amino group is preferably a substituted or unsubstituted amino carbonyl amino group having 1 to 30 carbon atoms, and examples thereof include a carbamoyl amino group, an N,N-dimethylamino carbonyl amino group, an N,N-diethyl amino carbonyl amino group, and a morpholino carbonyl amino group.

The alkoxycarbonylamino group is preferably a substituted or unsubstituted alkoxycarbonylamino group having 2 to 30 carbon atoms, and examples thereof include a methoxycarbonylamino group, an ethoxycarbonylamino group, a t-butoxycarbonylamino group, an n-octadecyloxycarbonylamino group, and an N-methyl-methoxycarbonylamino group.

The aryloxycarbonylamino group is preferably a substituted or unsubstituted aryloxycarbonylamino group having 7 to 30 carbon atoms, and examples thereof include a phenoxycarbonylamino group, a p-chlorophenoxycarbonylamino group, and an m-n-octyloxyphenoxycarbonylamino group.

The sulfamoylamino group is preferably a substituted or unsubstituted sulfamoylamino group having 0 to 30 carbon atoms, and examples thereof include a sulfamoylamino group, an N,N-dimethylaminosulfonylamino group, and an N-n-octylaminosulfonylamino group.

The alkyl or aryl sulfonylamino group is preferably a substituted or unsubstituted alkyl sulfonylamino group having 1 to 30 carbon atoms or a substituted or unsubstituted aryl sulfonylamino group having 6 to 30 carbon atoms, and examples thereof include a methyl sulfonylamino group, a butyl sulfonylamino group, a phenyl sulfonylamino group, a 2,3,5-trichlorophenyl sulfonylamino group, and a p-methylphenyl sulfonylamino group.

The alkylthio group is preferably a substituted or unsubstituted alkylthio group having 1 to 30 carbon atoms, and examples thereof include a methylthio group, an ethylthio group, and an n-hexadecylthio group.

The arylthio group is preferably a substituted or unsubstituted arylthio group having 6 to 30 carbon atoms, and examples thereof include a phenylthio group, a p-chlorophenylthio group, and an m-methoxyphenylthio group.

The heterocyclic thio group is preferably a substituted or unsubstituted heterocyclic thio group having 2 to 30 carbon atoms, and examples thereof include a 2-benzothiazolylthio group and a 1-phenyltetrazole-5-ylthio group.

The sulfamoyl group is preferably a substituted or unsubstituted sulfamoyl group having 0 to 30 carbon atoms, and examples thereof include an N-ethyl sulfamoyl group, an N-(3-dodecyloxypropyl)sulfamoyl group, an N,N-dimethyl sulfamoyl group, an N-acetyl sulfamoyl group, an N-benzoyl sulfamoyl group, and an N—(N'-phenylcarbamoyl) sulfamoyl group.

The alkyl or aryl sulfinyl group is preferably a substituted or unsubstituted alkyl sulfinyl group having 1 to 30 carbon atoms or a substituted or unsubstituted aryl sulfinyl group having 6 to 30 carbon atoms, and examples thereof include a methyl sulfinyl group, an ethyl sulfinyl group, a phenyl sulfinyl group, and a p-methylphenyl sulfinyl group.

The alkyl or aryl sulfonyl group is preferably a substituted or unsubstituted alkyl sulfonyl group having 1 to 30 carbon atoms or a substituted or unsubstituted aryl sulfonyl group having 6 to 30 carbon atoms, and examples thereof include a methyl sulfonyl group, an ethyl sulfonyl group, a phenyl sulfonyl group, and a p-methylphenyl sulfonyl group.

The acyl group is preferably a formyl group, a substituted or non-substituted alkyl carbonyl group having 2 to 30 carbon atoms, a substituted or non-substituted aryl carbonyl group having 7 to 30 carbon atoms, or a substituted or unsubstituted heterocyclic carbonyl group having 2 to 30 carbon atoms in which a carbonyl group is bonded to a carbon atom, and examples thereof include an acetyl group, a pivaloyl group, a 2-chloroacetyl group, a stearoyl group, a benzoyl group, a p-n-octyloxyphenylcarbonyl group, a 2-pyridylcarbonyl group, and a 2-furylcarbonyl group.

The aryloxycarbonyl group is preferably a substituted or unsubstituted aryloxycarbonyl group having 7 to 30 carbon atoms, and examples thereof include a phenoxycarbonyl group, an o-chlorophenoxycarbonyl group, an m-nitrophenoxycarbonyl group, and a p-t-butylphenoxycarbonyl group.

The alkoxycarbonyl group is preferably a substituted or unsubstituted alkoxycarbonyl group having 2 to 30 carbon atoms, and examples thereof include a methoxycarbonyl group, an ethoxycarbonyl group, a t-butoxycarbonyl group, and an n-octadecyloxycarbonyl group.

The carbamoyl group is preferably a substituted or unsubstituted carbamoyl group having 1 to 30 carbon atoms, and examples thereof include a carbamoyl group, an N-methylcarbamoyl group, an N,N-dimethylcarbamoyl group, an N,N-di-n-octylcarbamoyl group, and an N-(methylsulfonyl) carbamoyl group.

The aryl or heterocyclic azo group is preferably a substituted or unsubstituted aryl azo group having 6 to 30 carbon atoms or a substituted or unsubstituted heterocyclic azo group having 3 to 30 carbon atoms, and examples thereof include a phenyl azo group, a p-chlorophenyl azo group, and a 5-ethylthio-1,3,4-thiadiazol-2-yl azo group.

The imide group is preferably an N-succinimide group or an N-phthalimide group.

The phosphino group is preferably a substituted or unsubstituted phosphino group having 0 to 30 carbon atoms, and examples thereof include a dimethyl phosphino group, a diphenyl phosphino group, and a methylphenoxy phosphino group.

The phosphinyl group is preferably a substituted or unsubstituted phosphinyl group having 0 to 30 carbon atoms, and examples thereof include a phosphinyl group, a dioctyloxy phosphinyl group, and a diethoxy phosphinyl group.

The phosphinyloxy group is preferably a substituted or unsubstituted phosphinyloxy group having 0 to 30 carbon atoms, and examples thereof include a diphenoxy phosphinyloxy group and a dioctyloxy phosphinyloxy group.

The phosphinylamino group is preferably a substituted or unsubstituted phosphinylamino group having 0 to 30 carbon atoms, and examples thereof include a dimethoxy phosphinylamino group and a dimethylamino phosphinylamino group.

The silyl group is preferably a substituted or unsubstituted silyl group having 0 to 30 carbon atoms, and examples thereof include a trimethylsilyl group, a t-butyldimethylsilyl group, or a phenyldimethylsilyl group.

Ionic Hydrophilic Group

The ionic hydrophilic group is not particularly limited, but examples thereof include a sulfo group, a carboxyl group, a thiocarboxyl group, a sulfino group, a phosphono group, a dihydroxy phosphino group, and a quaternary ammonium group. Particularly, the ionic hydrophilic group is preferably a sulfo group or a carboxyl group. Further, a carboxyl group, a phosphono group, and a sulfo group may be present in the form of a salt. Examples of the counter cation for forming the salt include an ammonium ion, an alkali metal ion (for example, a lithium ion, a sodium ion, or a potassium ion), and an organic cation (for example, a tetramethylammonium ion, a tetramethylguanidium ion, or a tetramethylphosphonium ion). The salt is preferably a lithium salt, a sodium salt, a potassium salt, or an ammonium salt, more preferably a lithium salt or a mixed salt including the lithium salt as a main component, and most preferably a lithium salt.

Color Material Represented by Formula (Y-1)

Hereinafter, an azo dye (yellow dye) represented by Formula (Y-1) will be described in detail.

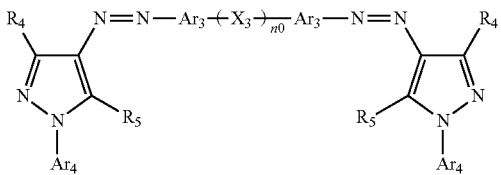

(Y-1)

(in Formula (Y-1), $R_4$ represents a substituent, $R_5$ represents —$OR_6$ or —$NHR_7$, each of $R_6$ and $R_7$ represents a hydrogen atom or a substituent, $X_3$ represents a divalent linking group, n0 is 0 or 1, $Ar_3$ represents a divalent heterocyclic group, and $Ar_4$ represents an alkyl group, an aryl group, or a triazine group.).

In Formula (Y-1), the divalent heterocyclic group represented by $Ar_3$ is preferably a 5- or 6-membered heterocyclic group, and may be further condensed. Further, the divalent heterocyclic group may be an aromatic heterocyclic ring or a non-aromatic heterocyclic ring. Examples of the divalent heterocyclic group represented by $Ar_3$ include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine, and thiazoline. Among these, aromatic heterocyclic groups are preferable, and preferable examples thereof, as exemplified above, include pyridine, pyrazine, pyrimidine, pyridazine, triazine, pyrazole, imidazole, benzimidazole, triazole, thiazole, benzothiazole, isothiazole, benzisothiazole, and thiadiazole. Thiadiazole is most preferable. They may further have a substituent. Examples of the substituent are the same as the above-mentioned substituent group A.

In Formula (Y-1), the substituent represented by $R_4$, $R_6$, and $R_7$ is selected from the above-mentioned substituent group A.

In Formula (Y-1), $R_4$ is preferably an alkyl group, an alkoxy group, or an aryl group, preferably an alkyl group having 1 to 4 carbon atoms, more preferably a methyl group, an ethyl group, a tertiary butyl group, a phenyl group, a methoxy group, or an ethoxy group, and further preferably a tertiary butyl group.

In Formula (Y-1), $R_5$ is preferably a substituted or unsubstituted amino group, and more preferably an unsubstituted amino group.

In Formula (Y-1), $Ar_4$ is preferably a substituted or unsubstituted aryl group, and more preferably a substituted or unsubstituted phenyl group.

In Formula (Y-1), when $R_4$, $R_5$, and $Ar_4$ further have a substituent, examples of the substituent include the above-mentioned substituent group A. Examples of the substituent include preferably an alkyl group, an aryl group, a heterocyclic group, a cyano group, a hydroxyl group, a nitro group, or an alkoxy group, and more preferably an alkyl group, an aryl group, or a heterocyclic group.

In Formula (Y-1), examples of the divalent linking group represented by $X_3$ include preferably an alkylene group (for example, methylene, ethylene, propylene, butylene, or pentylene), an alkenylene group (for example, ethenylene or propenylene), an alkynylene group (for example, ethynylene or propynylene), an arylene group (for example, phenylene or naphthylene), a divalent heterocyclic group (for example, a 6-chloro-1,3,5-triazine-2,4-diyl group, a pyrimidine-2,4-diyl group, or a quinoxaline-2,3-diyl group), —O—, —CO—, —$NR_A$— ($R_A$ is a hydrogen atom, an alkyl group, or an aryl group), —S—, —$SO_2$—, —SO—, and a combination thereof.

In Formula (Y-1), the alkylene group, alkenylene group, alkynylene group, arylene group, or divalent heterocyclic group, represented by X3, and the alkyl group or aryl group represented by $R_A$ may have a substituent. Examples of the substituent are the same as those of the above substituent. The alkyl group or aryl group represented by $R_A$ includes a substituted or unsubstituted alkyl group or aryl group. The substituted or unsubstituted alkyl group is preferably an alkyl group having 1 to 30 carbon atoms, and the substituted or unsubstituted aryl group is preferably an aryl group having 6 to 30 carbon atoms.

In Formula (Y-1), the divalent linking group represented by $X_3$ is more preferably an alkylene group having 10 or less carbon atoms, an alkenylene group having 10 or less carbon atoms, an alkynylene group having 10 or less carbon atoms, an arylene group having 6 to 10 carbon atoms, a divalent heterocyclic group, —O—, —S—, or a combination thereof, and further preferably an alkylene group, —S—, or a combination thereof.

The total number of carbon atoms in the divalent linking group is preferably 0 to 50, more preferably 0 to 30, and most preferably 0 to 10.

In Formula (Y-1), the aryl group or arylene group represented by $Ar_4$ is the same as the above-mentioned aryl group or arylene group represented by $R_4$. Further, the triazine group represented by $Ar_4$ may have a monovalent substituent (the monovalent substituent is the same as that in the above-mentioned substituent group A.).

The color material represented by Formula (Y-1) is not particularly limited, but is preferably a compound represented by Formula (Y-1-1) below, and more preferably a compound represented by Formula (Y-1-2) below.

(Y-1-1)

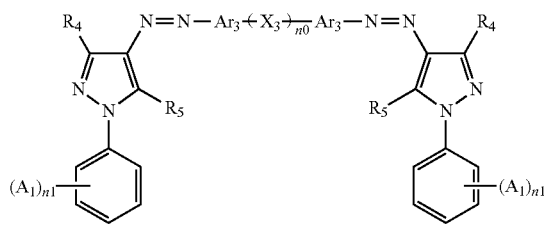

(in Formula (Y-1-1), $R_4$ represents a substituent, $R_5$ represents —$OR_6$ or —$NHR_7$, each of $R_6$ and $R_7$ represents a hydrogen atom or a substituent, $X_3$ represents a divalent linking group, n0 is 0 or 1, $Ar_3$ represents a divalent heterocyclic group, $A_1$ represents an ionic hydrophilic group, and n1 represents 0 to 2.)

In Formula (Y-1-1), $R_4$, $R_5$, $Ar_3$, n0, and $X_3$ are the same as $R_4$, $R_5$, $Ar_3$, n0, and $X_3$ in Formula (Y-1).

In Formula (Y-1-1), the ionic hydrophilic group represented by $A_1$ is preferably —$SO_3M$ or —$CO_2M$, more preferably —$SO_3M$, and particularly preferably —$CO_2K$. M's each independently represent a hydrogen atom or a monovalent counter cation. Examples of the monovalent counter cation include an ammonium ion, alkali metal ions (for example, lithium ion, sodium ion, and potassium ion), and organic cations (for example, tetramethyl ammonium ion, tetramethyl guanidium ion, and tetramethyl phosphonium), preferably a lithium salt, a sodium salt, a potassium salt, and an ammonium salt, more preferably a potassium salt or a mixed salt including the potassium salt as a main component, and most preferably a potassium salt.

Formula (Y-1-2):

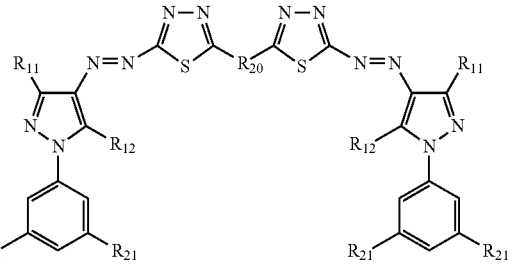

(in Formula (Y-1-2), $R_{20}$ represents an alkylene group, —S—, or a linking group including a combination thereof, $R_{21}$ represents an ionic hydrophilic group, $R_{11}$ represents an alkyl group, and $R_{12}$ represents an amino group).

In Formula (Y-1-2), $R_{20}$ is the same as the alkylene group in the divalent linking group represented by $X_3$ of Formula (Y-1).

In Formula (Y-1-2), $R_{21}$ represents a carboxyl group (—$CO_2M$). M's each independently represent a hydrogen atom or a monovalent counter cation. Examples of the monovalent counter cation include an ammonium ion, alkali metal ions (for example, lithium ion, sodium ion, and potassium ion), and organic cations (for example, tetramethyl ammonium ion, tetramethyl guanidium ion, and tetramethyl phosphonium), preferably a lithium salt, a sodium salt, a potassium salt, and an ammonium salt, more preferably a potassium salt or a mixed salt including the potassium salt as a main component, and most preferably a potassium salt.

In the formula (Y-1-2), the alkyl group represented by $R_{11}$ and the amino group represented by $R_{12}$ are the same as the alkyl group and amino group respectively represented by $R_4$ and $R_5$ of Formula (Y-1).

Specific examples of the compound represented by Formula (Y-1) are shown below. However, the compound used in the present embodiment is not limited to the following examples. Here, in specific examples, Et means ethyl, and Ph means phenyl.

| pigment | R |
|---|---|
| 1 | —$SCH_2S$— |
| 2 | —$SCH_2CH_2S$— |
| 3 | —$SCH_2CH_2CH_2S$— |
| 4 | —$SCH_2CH_2CH_2CH_2CH_2S$— |

-continued

| # | Structure |
|---|---|
| 5 | —SCH$_2$CH(CH$_3$)S— |
| 6 | —SCH$_2$CH$_2$CH(CH$_3$)S— |
| 7 | —SC$_2$H$_4$OC$_2$H$_4$S— |
| 8 | —SC$_2$H$_4$OC$_2$H$_4$OC$_2$H$_4$S— |
| 9 | —SCH$_2$CH(OH)CH$_2$S— |
| 10 | —SCH$_2$CH(CH$_2$OH)S— |
| 11 | —SCH(COONa)CH$_2$S— |
| 12 | —SCH(COONa)CH$_2$CH$_2$CH(COONa)S— |
| 13 | —SCH(COONa)—CH(COONa)S— |
| 14 | 1,4-phenylene |
| 15 | 1,3-phenylene |
| 16 | bis(3-methylphenyl)urea linkage (—C$_6$H$_4$—NHCONH—C$_6$H$_4$—, 3,3'-) |
| 17 | bis(4-methylphenyl)urea linkage (—C$_6$H$_4$—NHCONH—C$_6$H$_4$—, 4,4'-) |

Structure:

t-C$_4$H$_9$—[pyrazole(NH$_2$, Ar)]—N=N—[1,3,4-thiadiazole-S]—R—[1,3,4-thiadiazole-S]—N=N—[pyrazole(NH$_2$, Ar)]—C$_4$H$_9$-t

| pigment | Ar | R |
|---|---|---|
| 18 | 2-methyl-4-(COONa)-phenyl with NaOOC at position (3,5-dicarboxylato-2-methylphenyl) | —SC$_3$H$_6$S— |

-continued
| | | |
|---|---|---|
| 19 | 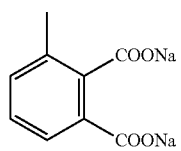 | —SC$_3$H$_6$S— |
| 20 | 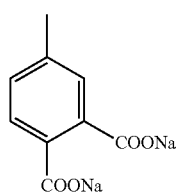 | —SC$_3$H$_6$S— |
| 21 | 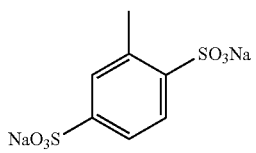 | —SC$_3$H$_6$S— |
| 22 | 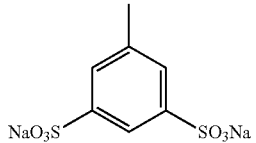 | —SC$_3$H$_6$S— |
| 23 | 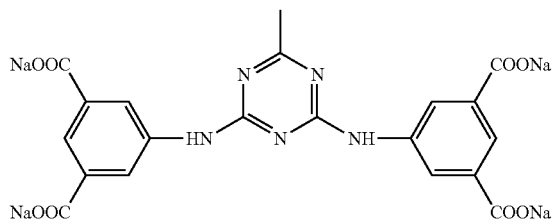 | —SC$_3$H$_6$S— |
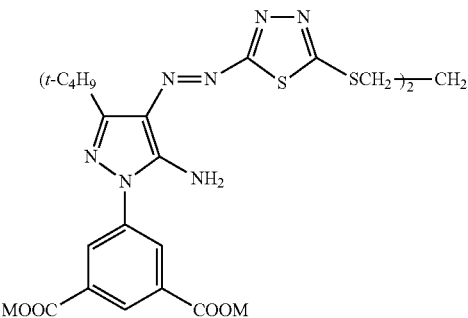
| pigment | M |
|---|---|
| 24 | K |
| 25 | Li |

-continued
| | | |
|---|---|---|
| 26 | | NH$_4$ |
| 27 | | NH(Et)$_3$ |
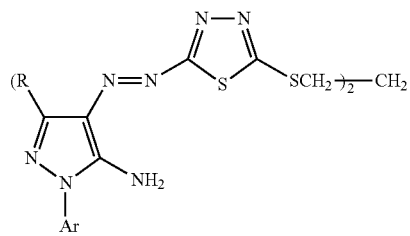
| pigment | R | Ar |
|---|---|---|
| 28 | OEt | 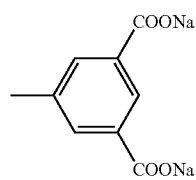 |
| 29 | Ph | 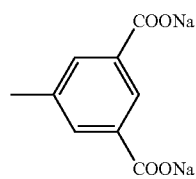 |
| 30 | t-C$_4$H$_9$ | C$_3$H$_6$SO$_3$Na |
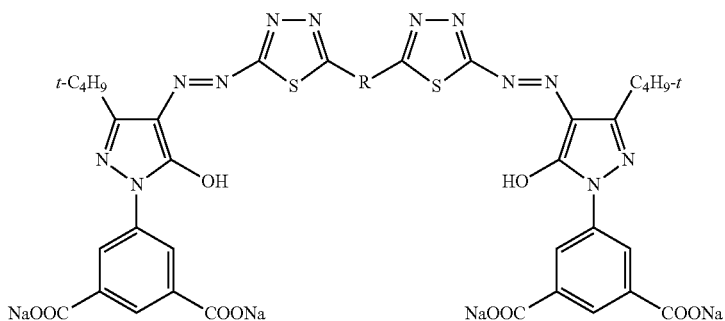
| pigment | R |
|---|---|
| 31 | —SCH$_2$CH$_2$S— |
| 32 | —SCH$_2$CH$_2$CH$_2$S— |

-continued

| | |
|---|---|
| 33 | —SCH$_2$CH$_2$CH$_2$CH$_2$CH$_2$S— |
| 34 | |

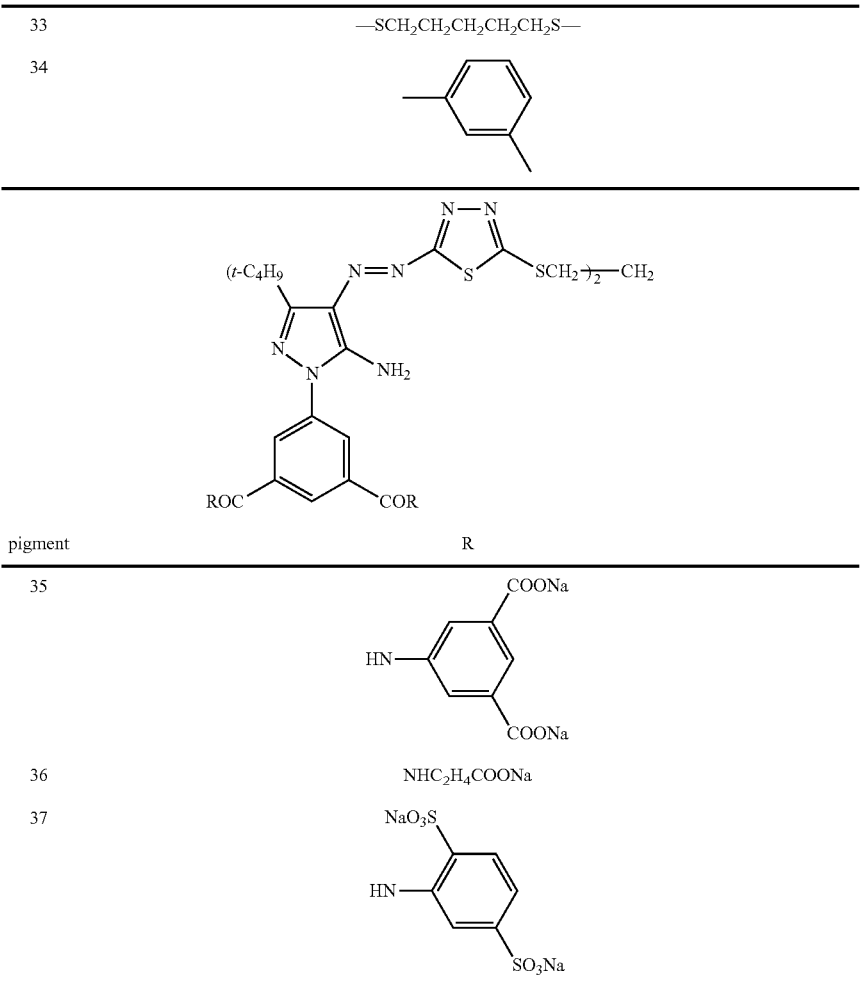

| pigment | R |
|---|---|
| 35 | HN—C$_6$H$_3$(COONa)$_2$ (3,5-COONa) |
| 36 | NHC$_2$H$_4$COONa |
| 37 | HN—C$_6$H$_3$(SO$_3$Na)$_2$ |

The compound represented by Formula (Y-1) can be synthesized by a general synthesis method. For example, this compound can be synthesized by the change of a diazo component and a coupling component or the various combinations thereof described in JP-A-2004-083903.

The content of the color material represented by Formula (Y-1) is preferably 1.0 mass % to 7.0 mass %, more preferably 2.0 mass % to 6.0 mass %, and further preferably 2.0 mass % to 5.0 mass %, with respect to the total amount of yellow ink. When the content of the color material represented by Formula (Y-1) is within the above range, there is a tendency to obtain an image having excellent coloring ability, light resistance, and color hue.

Dye (Y-2)

An example of the dye (Y-2) includes a dye selected from the group consisting of C.I. Direct Yellows 86, 132, and 142. In addition, the dye (Y-2) is not particularly limited, but examples thereof can include C.I. Direct Yellows 1, 12, 24, 33, 50, 55, 58, 86, 132, 142, 144, and 173. Among these, at least one of C.I. Direct Yellows 86 and 132 is preferable. When such a dye is used, dye aggregation is relaxed in the head nozzle face of an ink jet printer, and thus printing stability tends to be further improved.

The content of the dye (Y-2) is preferably 0.050 mass % to 1.2 mass %, more preferably 0.10 mass % to 1.0 mass %, and further preferably 0.30 mass % to 0.90 mass %. When the content of the dye (Y-2) is 0.050 mass % or more, dye aggregation is relaxed in the head nozzle face of an ink jet printer, and thus printing stability tends to be further improved. Further, when the content of the dye (Y-2) is 1.2 mass % or less, dye aggregation is relaxed in the head nozzle face of an ink jet printer without deteriorating the light resistance performance of printed matter, which is the inherent nature of the dye (Y-1), and thus printing stability tends to be further improved.

The content ratio A of the dye (Y-1) and the dye (Y-2) (the dye (Y-1):the dye (Y-2)) is preferably 7:3 to 9.5:0.5, more preferably 7.5:2.5 to 9.3:0.7, and further preferably 8:2 to 9:1. When the content ratio A is within the above range, dye aggregation is relaxed in the head nozzle face of an ink jet printer without deteriorating the light resistance performance of printed matter, which is inherent nature of the dye (Y-1), and thus printing stability tends to be further improved.

Compound Represented by Formula (Y-3)

The ink composition according to the present embodiment may further include a dye (Y-3) represented by Formula (Y-3). When the ink composition includes the dye (Y-3), the light resistance performance of printed matter tends to be further improved. Hereinafter, the dye (Y-3) represented by Formula (Y-3) will be described in detail.

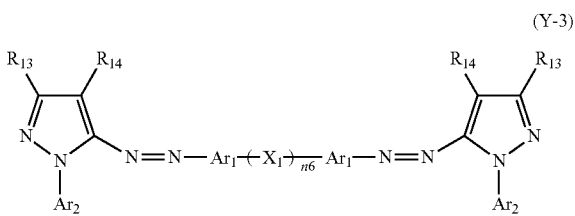

(Y-3)

(in Formula (Y-3), $R_{13}$'s each independently represent a hydrogen atom or a substituent, $R_{14}$'s each independently represent —$OR_{16}$, —$NHR_{17}$, or a cyano group, each of $R_{16}$ and $R_{17}$ represents a hydrogen atom or a substituent, $X_1$ represents a substituted or unsubstituted aryl group or a substituted or unsubstituted triazine group, n6 is 0 or 1, $Ar_1$'s each independently represent a divalent heterocyclic group, and $Ar_2$'s each independently represent a substituted or unsubstituted alkyl group, a substituted or unsubstituted aryl group, or a substituted or unsubstituted triazine group.)

In Formula (Y-3), $R_{13}$'s are each independently preferably a hydrogen atom, a substituted or unsubstituted alkyl group, a substituted or unsubstituted alkoxy group, or a substituted or unsubstituted aryl group, more preferably a hydrogen atom, a methyl group, an ethyl group, a tertiary butyl group, a phenyl group, a methoxy group, or an ethoxy group, and further preferably a hydrogen atom or a tertiary butyl group. When each of $R_{13}$'s further has a substituent, examples of the substituent include the above-mentioned substituent group A. The substituent is preferably an alkyl group, an aryl group, a heterocyclic group, a cyano group, a hydroxyl group, a nitro group, or an alkoxy group, and more preferably an alkyl group, an aryl group, or a heterocyclic group.

Each of $R_{14}$'s is preferably a cyano group.

In Formula (Y-3), the divalent heterocyclic group represented by $Ar_1$ is preferably a 5- or 6-membered heterocyclic group, and may have a condensed ring. Further, the divalent heterocyclic group may have an aromatic heterocyclic ring or a non-aromatic heterocyclic ring.

In Formula (Y-3), examples of the divalent heterocyclic group represented by $Ar_1$ include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine, and thiazoline. Among these, aromatic heterocyclic groups are preferable, and preferable examples thereof, as exemplified above, include pyridine, pyrazine, pyrimidine, pyridazine, triazine, pyrazole, imidazole, benzimidazole, triazole, thiazole, benzothiazole, isothiazole, benzisothiazole, and thiadiazole. Thiadiazole is most preferable. They may further have a substituent. Examples of the substituent are the same as the above-mentioned substituent group A. The substituent is preferably an alkyl group, an aryl group, a heterocyclic group, a cyano group, a hydroxyl group, a nitro group, or an alkoxy group, and more preferably an alkyl group, an aryl group, or a heterocyclic group.

In Formula (Y-3), $Ar_2$'s are each independently preferably a substituted or unsubstituted aryl group, further preferably a substituted or unsubstituted phenyl group, and particularly preferably a phenyl group substituted with an ionic hydrophilic group. The ionic hydrophilic group is preferably —$SO_3M$ or —$CO_2M$, and more preferably —$CO_2M$. M's each independently represent a hydrogen atom or a monovalent counter cation. Examples of the monovalent counter cation include an ammonium ion, alkali metal ions (for example, lithium ion, sodium ion, and potassium ion), and organic cations (for example, tetramethyl ammonium ion, tetramethyl guanidium ion, and tetramethyl phosphonium), and preferably a lithium salt, a sodium salt, a potassium salt, and an ammonium salt. The ionic hydrophilic group is preferably a carboxyl group, and further preferably a potassium salt of a carboxyl group.

In Formula (Y-3), the divalent linking group represented by $X_1$ is preferably an alkylene group (for example, methylene, ethylene, propylene, butylene, or pentylene), an alkenylene group (for example, ethenylene or propenylene), an alkynylene group (for example, ethynylene or propynylene), an arylene group (for example, phenylene or naphthylene), a divalent heterocyclic group (for example, a 6-chloro-1,3,5-triazine-2,4-diyl group, a pyrimidine-2,4-diyl group, or a quinoxaline-2,3-diyl group), —O—, —CO—, —$NR_4$— ($R_4$ is a hydrogen atom, an alkyl group, or an aryl group), —S—, —$SO_2$—, —SO—, or a combination thereof. These groups may further be substituted with —$OR_{20}$ ($R_{20}$ represents a hydrogen atom or a cation, and represents $Li^+$ ion, $Na^+$ ion, $K^+$ ion, or $NH_4^+$ ion when M is a cation). The divalent linking group is more preferably a divalent heterocyclic group, and particularly preferably a 6-chloro-1,3,5-triazine-2,4-diyl group, and further particularly preferably a 6-chloro-1,3,5-triazine-2,4-diyl group substituted with —$OR_{20}$.

n6 is preferably 1.

The compound represented by Formula (Y-3) is preferably a compound represented by Formula (Y-3-1) below, and further preferably a compound represented by Formula (Y-3-2) below.

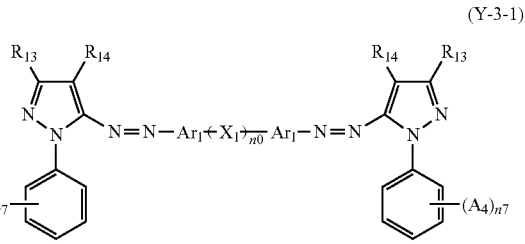

(Y-3-1)

(in Formula (Y-3-1), $R_{13}$'s each independently represent a hydrogen atom or a substituent, $R_{14}$'s each independently represent —$OR_{16}$, —$NHR_{17}$, or cyano group, each of $R_{16}$ and $R_{17}$ represents a hydrogen atom or a substituent, $X_1$ represents a substituted or unsubstituted aryl group or a substituted or unsubstituted triazine group, n0 is 0 or 1, $Ar_1$'s each independently represent a divalent heterocyclic group, $A_4$'s each independently represent an ionic hydrophilic group, and n7 represents 0 to 2).

In Formula (Y-3-1), $Ar_1$, $R_{13}$, $R_{14}$, n6, and $X_1$ are the same as $Ar_1$, $R_{13}$, $R_{14}$, n6, and $X_1$ in Formula (Y-3).

In Formula (Y-3-1), the ionic hydrophilic group represented by $A_4$ is preferably —$SO_3M$ or —$CO_2M$, more preferably —$SO_3M$, and particularly preferably —$CO_2K$. M's each independently represent a hydrogen atom or a monovalent counter cation. Examples of the monovalent counter cation include an ammonium ion, alkali metal ions (for example, lithium ion, sodium ion, and potassium ion), and organic cations (for example, tetramethyl ammonium ion, tetramethyl guanidium ion, and tetramethyl phosphonium), preferably a lithium salt, a sodium salt, a potassium salt, and an ammonium salt, more preferably a potassium salt or a mixed salt including the potassium salt as a main component, and most preferably a potassium salt.

In Formula (Y-3-1), n7 is preferably 1 or 2, and more preferably 2.

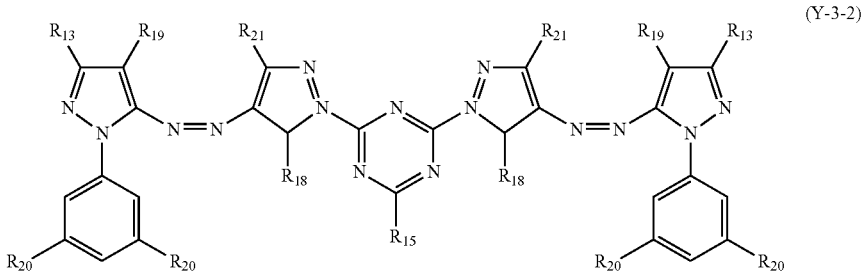

(Y-3-2)

(In Formula (Y-3-2), $R_{15}$ represents —OM, $R_{20}$ represents —$CO_2M$, and M represents a hydrogen atom or a monovalent counter cation. $R_{21}$ represents a substituted or unsubstituted alkyl group, $R_{13}$'s each independently represent a hydrogen atom or a substituent, $R_{18}$ represents a substituted or unsubstituted amino group, and $R_{19}$ represents a cyano group.)

In Formula (Y-3-2), $R_{13}$ and M are the same as $R_{13}$ and M in Formula (Y-3).

In Formula (Y-3-2), $R_{21}$'s are each independently preferably a hydrogen atom, a substituted or unsubstituted alkyl group, a substituted or unsubstituted alkoxy group, or a substituted or unsubstituted aryl group, more preferably a hydrogen atom, a methyl group, an ethyl group, a tertiary butyl group, a phenyl group, a methoxy group, or an ethoxy group, and further preferably a hydrogen atom or a tertiary butyl group. When each of $R_{21}$'s further has a substituent, the substituent is exemplified in the above-mentioned substituent group A. The substituent is preferably an alkyl group, an aryl group, a heterocyclic group, a cyano group, a hydroxyl group, a nitro group, or an alkoxy group, and more preferably an alkyl group, an aryl group, or a heterocyclic group.

In Formula (Y-3-2), $R_{18}$ is preferably an unsubstituted amino group.

Next, specific examples of the compound represented by Formula (Y-3) are shown in Table below.

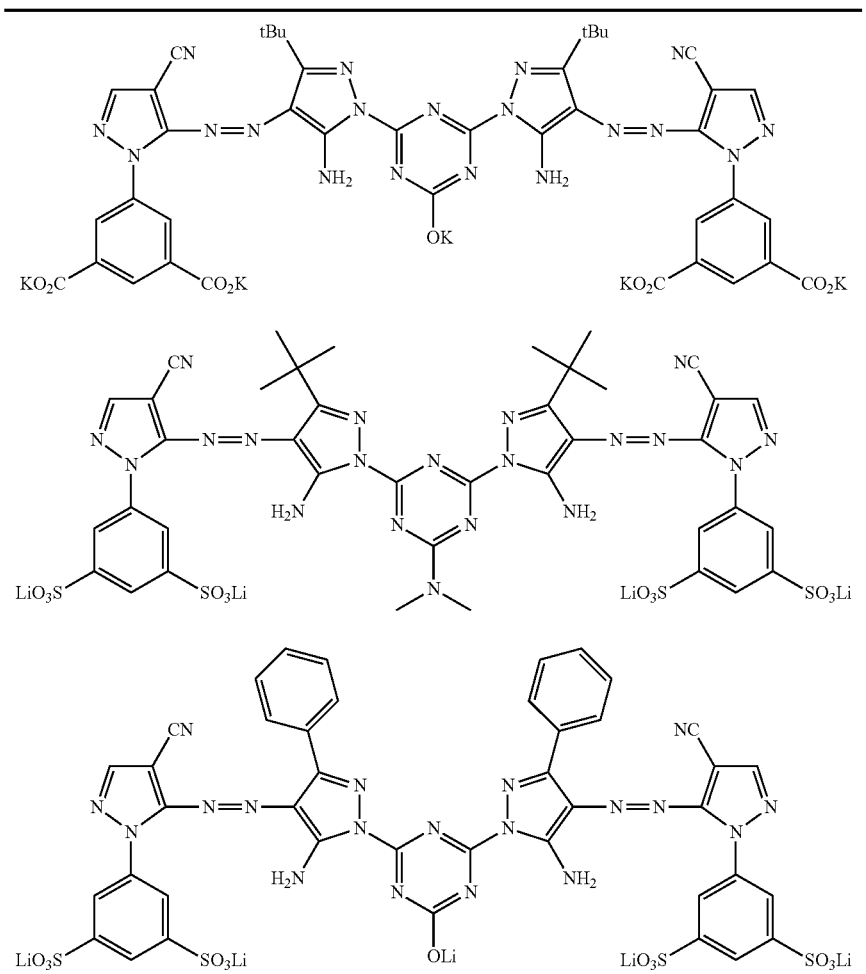

-continued
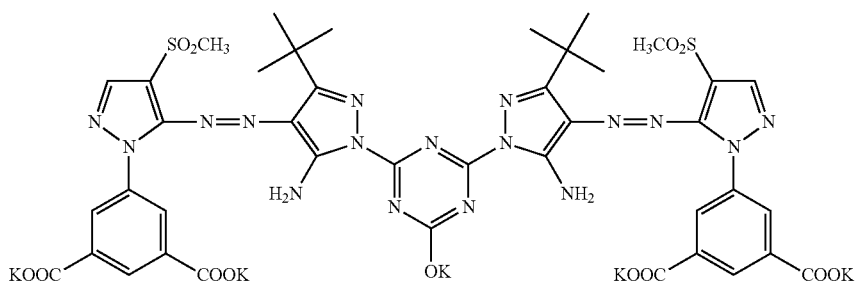
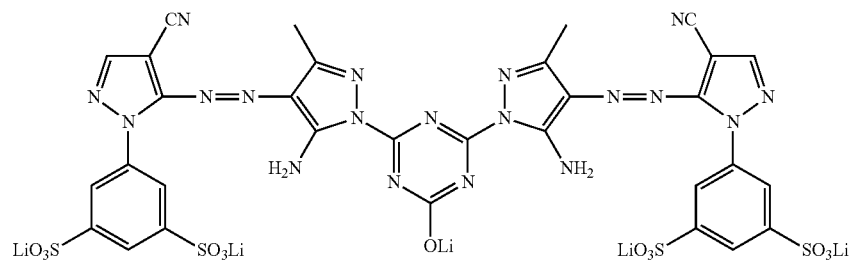
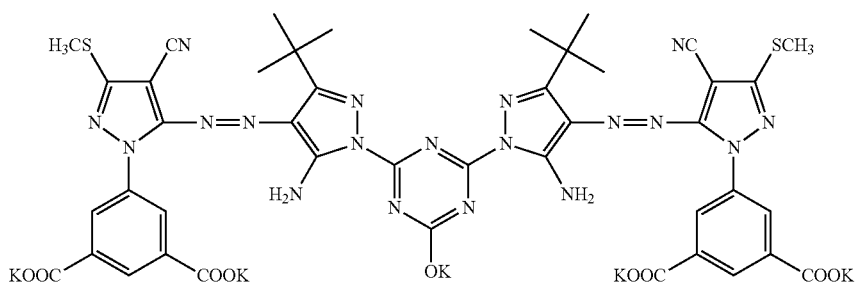
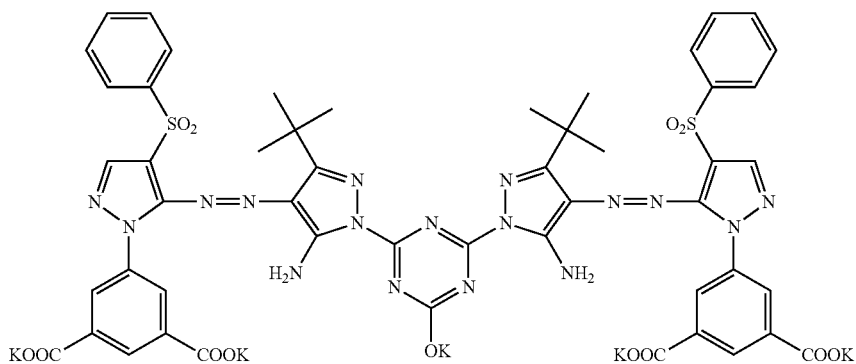
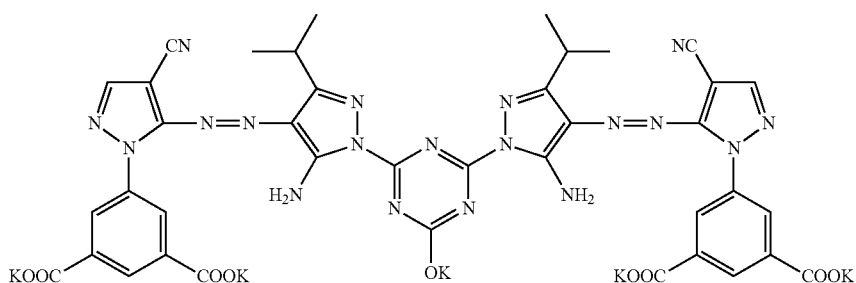

-continued
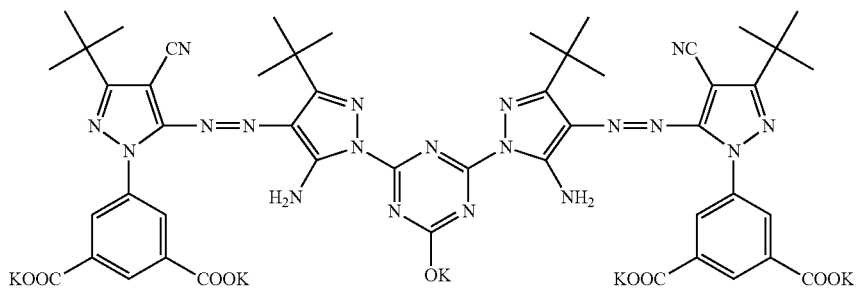
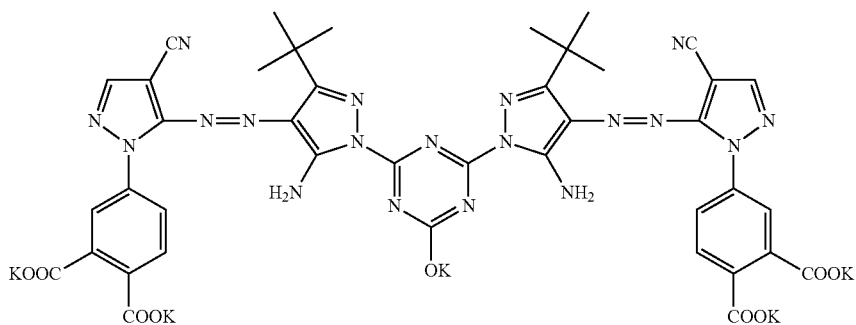
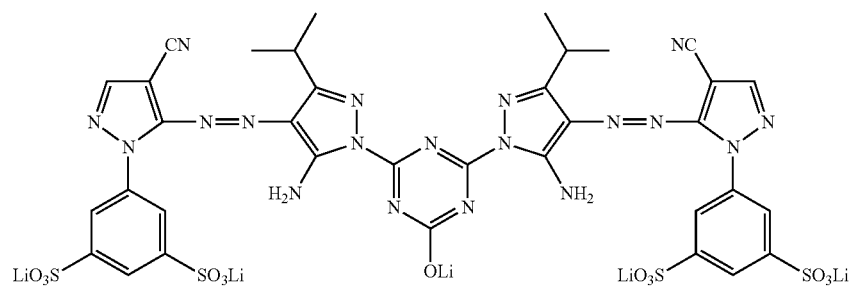
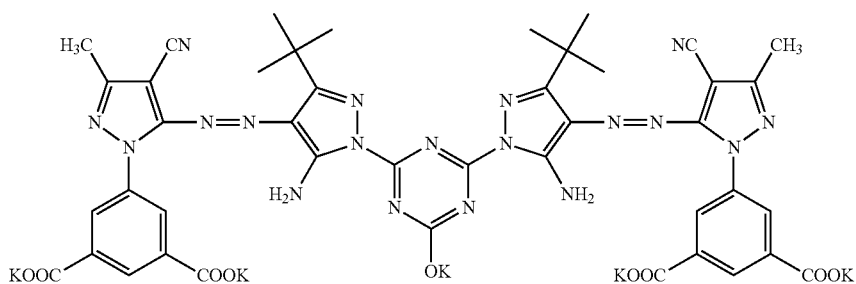
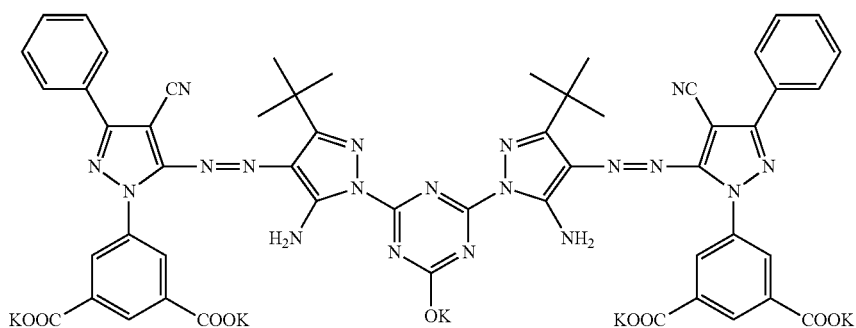

The above-mentioned compound is synthesized by the synthesis method described in JP-A-2006-57076 or JP-A-2007-217681.

The content of the dye represented by Formula (Y-3) is preferably 0.10 mass % to 2.5 mass %, more preferably 0.25 mass % to 2.0 mass %, and further preferably 0.50 mass % to 1.5 mass %, with respect to the total amount of the ink composition. When the content of the dye represented by Formula (Y-3) is within the above range, dye aggregation is relaxed in the head nozzle face of an ink jet printer, and thus there is a tendency to further improve printing stability and obtain improved light resistance performance of printed matter.

The content ratio B of the dye (Y-1) and the dye (Y-3) (the dye (Y-1):the dye (Y-3)) is preferably 65:35 to 95:5, more preferably 70:30 to 90:10, and further preferably 75:25 to 85:15. When the content ratio B is within the above range, the light resistance performance of printed matter tends to be further improved.

The content ratio C of (the dye (Y-2) and the dye (Y-3) the dye (Y-2):the dye (Y-3)) is preferably 15:85 to 65:35, more preferably 20:80 to 60:40, and further preferably 25:75 to 55:45. When the content ratio C is within the above range, dye aggregation is relaxed in the head nozzle face of an ink jet printer, and thus printing stability tends to be further improved.

Components Other than Dyes

Hereinafter, components other than dyes, which can be contained in the ink composition, will be described. Alkylene oxide adduct of acetylene glycol having a main chain of 12 or more carbon atoms and acetylene glycol having a main chain of 10 or more carbon atoms The ink composition according to the present embodiment preferably includes an alkylene oxide adduct of an acetylene glycol having a main chain of 12 or more carbon atoms, and an acetylene glycol having a main chain of 10 or more carbon atoms. When the ink composition includes the alkylene oxide adduct of an acetylene glycol, and the acetylene glycol having a main chain of 10 or more carbon atoms, color reproducibility and bleeding are suppressed, and thus image quality tends to be further improved. Alkylene oxide adduct of acetylene glycol having a main chain of 12 or more carbon atoms The alkylene oxide adduct of an acetylene glycol having a main chain of 12 or more carbon atoms (hereinafter, referred to as "acetylene glycol A") is contained in an acetylene glycol-based surfactant (nonionic surfactant) together with an acetylene glycol having a main chain of 10 or more carbon atoms. The nonionic surfactant functions to uniformly spread ink onto a recording medium. Therefore, when ink jet recording is performed using the ink containing the nonionic surfactant, a relatively high-resolution image with less bleeding can be obtained. Here, the "main chain" in the present specification means a main chain based on the IUPAC nomenclature system.

In particular, since the acetylene glycol A has a main chain of 12 or more carbon atoms, it has excellent wettability against a polymer member, such as rubber or plastic, constituting an ink flow channel, and foreign matter causing the generation of bubbles in the ink. Therefore, when the acetylene glycol A is used, it is possible to prevent the generated bubbles from remaining on the surface of the ink flow channel of the polymer member from an ink tank to a head. Further, in this case, initial filling properties are excellent, and both the growth of residual bubbles and the dead pixels caused by the detachment of bubbles attached to the surface of the ink flow channel can be prevented, so as to make continuous printing stability good. Moreover, since the acetylene glycol A is an alkylene oxide adduct, the solubility thereof in the ink is made excellent.

The hydrophlie-lipophile balance (HLB) value of the acetylene glycol A is preferably 8 to 15 because the above-described wettability becomes further excellent. Here, the HLB value refers to a HLB value defined by the Griffin method.

The acetylene glycol A is not particularly limited to below, but examples thereof include compounds represented by Formula (1) below.

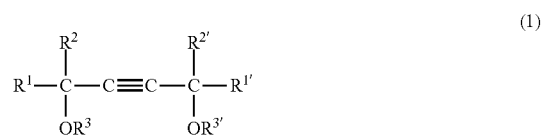

(In Formula (1), $R^1$, $R^{1'}$, $R^2$, and $R^{2'}$ each independently represent an alkyl group having 1 to 5 carbon atoms, the number of carbon atoms in the main chain is 12 or more, $—OR^3$ Represents $—OH$ or $—O(C_2H_4O)_mH$, and $—OR^{3'}$ represents $—OH$ or $—O(C_2H_4O)_nH$. In this case, m and n are each independently a value including a decimal number of 0.5 to 25, and m+n is a value including a decimal number of 1 to 40 (however, except the case that both $—OR^3$ and $—OR^{3'}$ are $—OH$).)

Specific examples of the acetylene glycol A include, but are not limited to, ethoxylates of 2,5,8,11-tetramethyl-6-dodecyne-5,8-diol and ethoxylates of 5,8-dimethyl-6-dodecyne-5,8-diol. In the alkylene oxide adduct of acetylene glycol, an ethylene oxide adduct of acetylene glycol and a propylene oxide adduct of acetylene glycol are preferable, and an ethylene oxide adduct of acetylene glycol is more preferable.

The addition number of moles of alkylene oxide units in acetylene glycol is preferably 1 mol to 20 mol with respect to each of $R^3$ and $R^{3'}$. The total addition number of moles (sum of $R^3$ and $R^{3'}$) is preferably 2 mol to 40 mol. When the total addition number of moles of alkylene oxide is 40 mol or less, static and dynamic surface tension can be reduced, and thus the absorption performance of ink can be made good.

Examples of the commercially available product of the acetylene glycol A include, but are not limited to, Olfine EXP4300 (trade name, manufactured by Nissin Chemical Industry Co., Ltd., carbon number 12, ethylene oxide adduct).

The acetylene glycol A may be used alone or in combination of two or more kinds thereof.

The content of the acetylene glycol A contained in the ink composition according to the present embodiment is preferably 0.050 mass % to 1.0 mass %, more preferably 0.075 mass % to 0.75 mass %, and further preferably 0.10 mass % to 0.50 mass %, with respect to the total amount of the ink composition. When the content of the acetylene glycol A is 0.050 mass % or more, the wettability into a hydrophobic surface increases, and thus filling properties tend to be further improved. Further, when the content of the acetylene glycol A is 0.30 mass % or less, dissolution stability tends to be further improved.

Acetylene Glycol Having a Main Chain of 10 or More Carbon Atoms

The acetylene glycol having a main chain of 10 or more carbon atoms (hereinafter, referred to as "acetylene glycol B") can effectively remove the bubbles generated in the ink. Thus, initial filling properties and continuous printing stability are made excellent.

The HLB value of the acetylene glycol B is preferably 7 or less, and more preferably 3 to 5 because of excellent defoaming properties.

The acetylene glycol B is not particularly limited to below, but examples thereof include acetylene glycols represented by Formula (2) below.

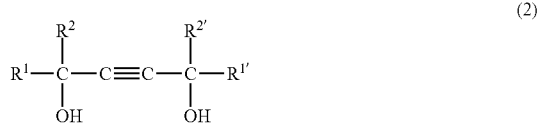

(In Formula (2), $R_1$, $R^{1'}$, $R^2$, and $R^{2'}$ each independently represent an alkyl group having 1 to 5 carbon atoms, the number of carbon atoms in the main chain is 10 or more. Here, $R^1$, $R^{1'}$, $R^2$, and $R^{2'}$ in Formula (2) are not related to $R^1$, $R^{1'}$, $R^2$, and $R^{2'}$ in Formula (1) described above.)

Specific examples of the acetylene glycol B include, but are not limited to, preferably 2,5,8,11-tetramethyl-6-dodecyne-5,8-diol, 5,8-dimethyl-6-dodecyne-5,8-diol, 2,4,7,9-tetramethyl-5-decyne-4,7-diol and 4,7-dimethyl-5-decyne-4,7-diol.

Examples of the commercially available product of the acetylene glycol B include, but are not limited to, Surfynol 104PG50 (2,4,7,9-tetramethyl-5-decyne-4,7-diol), Surfynol DF110D (2,5,8,11-tetramethyl-6-dodecyne-5,8-diol) (all are trade names, manufactured by Air Products and Chemicals, Inc.).

The acetylene glycol B may be used alone or in combination of two or more kinds thereof.

The content of the acetylene glycol B is preferably 0.050 mass % to 1.0 mass %, more preferably 0.075 mass % to 0.75 mass %, and further preferably 0.10 mass % to 0.50 mass %, with respect to the total amount of the ink composition. When the content of the acetylene glycol B is 0.050 mass % or more, defoaming properties increase, and thus filling properties tend to be further improved. Further, when the content of the acetylene glycol B is 0.30 mass % or less, dissolution stability tends to be further improved.

The total content of the acetylene glycol A and the acetylene glycol B is preferably 0.10 mass % to 1.25 mass %, more preferably 0.30 mass % to 1.0 mass %, and further preferably 0.45 mass % to 0.75 mass %, with respect to the total amount of the ink composition. When the total content of the acetylene glycol A and the acetylene glycol B is within the above range, solubility in ink is improved, and thus it is possible to effectively prevent the generation of aggregate at the time of blending these acetylene glycols.

Polyoxyalkylene Alkyl Ether

The ink composition according to the present embodiment may contain polyoxyalkylene alkyl ether. When the ink composition contains the polyoxyalkylene alkyl ether, the solubility and dispersibility of the acetylene glycol A and the acetylene glycol B tend to be further improved. Further, the polyoxyalkylene alkyl ether hardly affects the low dynamic surface tension of the acetylene glycol A and the acetylene glycol B.

Meanwhile, since an ink flow channel and an ink tank, each of which is made of a hydrophobic material, are generally used in a continuous ink supply system (CISS), in the ink set used in the continuous ink supply system, it is effective for each ink to use a relatively hydrophobic surfactant. From this viewpoint, it is effective to use the acetylene glycol A and the acetylene glycol B in combination thereof. However, from the viewpoint of improving dissolution stability, initial filling properties and continuous printing stability while obtaining the effects of the acetylene glycol A and the acetylene glycol B, particularly, when the ink set according to the present embodiment is used in a recording apparatus provided with the continuous ink supply system (CISS), it is preferable that each ink contains the polyoxyalkylene alkyl ether.

Here, the "ink supply system" refers to an ink supply system including: an ink storage container (ink tank) having an air inlet; a print head having nozzles for ejecting the liquid in the ink storage container; and an ink supply channel connecting the ink storage container and the print head to supply the liquid from the ink storage container to the print head.

Further, the "ink flow channel" refers to a flow channel for circulating the ink in an ink jet recording apparatus. Examples of the ink flow channel include an ink supply channel for supplying the ink from the ink storage container storing the ink to an ink jet type recording head and a flow channel for circulating the ink to the nozzle opening in the ink jet type recording head.

The HLB value of the polyoxyalkylene alkyl ether is preferably 11 to 16, and more preferably 12 to 15. When the HLB value of the polyoxyalkylene alkyl ether is within the above range, initial filling properties and continuous printing stability tend to be further improved.

Examples of the polyoxyalkylene alkyl ether include, but are not limited to, compounds represented by Formula (3) below. When such polyoxyalkylene alkyl ether is used, storage stability and continuous printing stability tend to be further improved.

$$R^6O(C_2H_4O)_w(C_3H_6O)_x(C_2H_4O)_y(O_3H_6O)_zH \quad (3)$$

(In Formula (3), $R^6$ represents an alkyl group having 1 to 20 carbon atoms, preferably an alkyl group having 5 to 15 carbon atoms, and more preferably an alkyl group having 10 to 15 carbon atoms. w is a value of 1 to 20, and x, y, and z are each independently a value of 0 or 1 to 20. w, x, y, and z satisfy 5≤w+x+y+z≤30, and preferably 5≤w+x+y+z≤25.)

Specific examples of the polyoxyalkylene alkyl ether include, but are not limited to, $C_{12}H_{25}O$ $(C_2H_4O)_6$ $(C_3H_6O)_2$ $(C_2H_4O)_6$ $(C_3H_6O)_8H$, $C_{13}H_{27}O$ $(C_2H_4O)_6(C_3H_6O)_2$ $(C_2H_4O)_6$ $(C_3H_6O)_8H$, $C_{12}H_{25}O$ $(C_2F_{14}O)_w$ $(C_3H_6O)_x$ $(C_2H_4O)_y(C_3H_6O)_zH$ (here, w+y=15, x+z=4), $C_{13}H_{27}O$ $(C_2H_4O)_w$ $(C_3H_6O)_x$ $(C_2H_4O)_y$ $(C_3H_6O)_zH$ (here, w+y=15, x+z=4), $C_{12}H_{25}O$ $(C_2H_4O)_8$ $(C_3H_6O)_2$ $(C_2H_4O)_6H$, $C_{13}H_{27}O$ $(C_2H_4O)_8$ $(C_3H_6O)_2$ $(C_2H_4O)_6H$, $C_{12}H_{25}O$ $(C_2H_4O)_{12}$ $(C_3H_6O)_2$ $(C_2H_4O)_{12}H$, $C_{13}H_{27}O$ $(C_2H_4O)_{12}$ $(C_3H_6O)_2$ $(C_2H_4O)_{12}H$, $CH_3$ $(CH_2)_9$ $(CH_3)$ CHO $(C_2H_4O)_7$ $(C_3H_6O)_{4.5}H$, $CH_3$ $(CH_2)_{11}$ $(CH_3)$ CHO $(C_2H_4O)_7$ $(C_3H_6O)_{4.5}H$, $CH_3$ $(CH_2)_9$ $(CH_3)$ CHO $(C_2H_4O)_5$ $(C_3H_6O)_{3.5}H$, $CH_3$ $(CH_2)_{11}$ $(CH_3)$ CHO $(C_2H_4O)_5$ $(C_3H_6O)_{3.5}H$, $C_{14}H_{29}O$ $(C_2H_4O)_{14}$ $(C_3H_6O)_2H$, $C_{11}H_{23}O$ $(C_2H_4O)_8H$, $C_{10}H_{21}O$ $(C_2H_4O)_{11}H$, and $C_{12}H_{25}O(C_2H_4O)_{15}H$.

Specific examples of the commercially available product of the polyoxyalkylene alkyl ether include, but are not limited to, NOIGEN DL-0415 ($R^6O(C_2H_4O)_w(C_3H_6O)_x$ $(C_2H_4O)_y$ $(C_3H_6O)_zH$, "$R^6$": alkyl having 12 or 13 carbon atoms, w+y=15, x+z=4, HLB value: 15.0), NOIGEN ET-116B (R$^6$O (C$_2$H$_4$O)$_7$(C$_3$H$_6$O)$_{4.5}$H, "R$^6$": alkyl having 12 or 14 carbon atoms, HLB value: 12.0), NOIGEN ET-106A (R$^6$O(C$_2$H$_4$O)$_5$(C$_3$H$_6$O)$_{3.5}$H, "R$^6$": alkyl having 12 or 14 carbon atoms, HLB value: 10.9), NOIGEN DH-0300 (R$^6$O(C$_2$H$_4$O)$_2$H, "R$^6$": alkyl having 14 carbon atoms, HLB value: 4.0), NOIGEN YX-400 (R$^6$O(C$_2$H$_4$O)$_{40}$H, "R$^6$": alkyl having 12 carbon atoms, HLB value: 18.1), NOIGEN EA-160 (C$_9$H$_{19}$C$_6$H$_4$O(C$_2$H$_4$O)$_{16.8}$H, HLB value: 15.4) (all are manufactured by DKS Co. Ltd.), and EMULGEN 1108 (trade name, manufactured by Kao Corporation, R$^6$O(C$_2$H$_4$O)$_8$H, "R$^6$": alkyl having 11 carbon atoms, HLB value: 13.4).

The polyoxyalkylene alkyl ether may be used alone or in combination of two or more kinds thereof.

The content of the polyoxyalkylene alkyl ether is preferably 0.50 mass % to 5.50 mass %, more preferably 1.0 mass % to 5.0 mass %, and further preferably 1.50 mass % to 4.50 mass %, with respect to the total amount of the ink composition. When the content of the polyoxyalkylene alkyl ether is within the above range, storage stability and continuous printing stability tend to be further improved.

The content of the polyoxyalkylene alkyl ether is preferably 5.0 parts by mass to 15 parts by mass, and more preferably 7.5 parts by mass to 12.5 parts by mass, with respect to 1 part by mass of the content of the acetylene glycol A. When the content of the polyoxyalkylene alkyl ether is within the above range, the acetylene glycol A is sufficiently solubilized, and thus water solubility tends to be improved. Therefore, there is a tendency to prevent the generation of aggregates at the time of blending or the occurrence of variation in absorptivity of ink.

The content of the polyoxyalkylene alkyl ether is preferably 2.5 parts by mass to 7.5 parts by mass, and more preferably 3.5 parts by mass to 6.5 parts by mass, with respect to 1 part by mass of the total content of the acetylene glycol A and the acetylene glycol B. When the content of the polyoxyalkylene alkyl ether is within the above range, the acetylene glycol A and the acetylene glycol B are sufficiently solubilized, and thus water solubility is improved. Therefore, there is a tendency to prevent the generation of aggregates at the time of blending the polyoxyalkylene alkyl ether with the acetylene glycol A and the acetylene glycol B or the occurrence of variation in absorptivity of ink.

Other Surfactants

The ink composition according to the present embodiment may contain a surfactant other than the above-described surfactant. The surfactant is not particularly limited, but preferable examples thereof include at least one of a fluorine-based surfactant and a silicone-based surfactant. When ink contains these surfactants, the dryness of the ink adhered to a cloth becomes better, and high-speed printing can be performed.

Among these surfactant, a silicone-based surfactant is more preferable because the solubility in the ink becomes high and foreign matter is hardly generated in the ink.

The fluorine-based surfactant is not particularly limited, but examples thereof include perfluoroalkyl sulfonates, perfluoroalkyl carboxylates, perfluoroalkyl phosphate esters, perfluoroalkyl ethylene oxide adducts, perfluoroalkyl betaine, and perfluoroalkyl amine oxide compounds. The commercially available product of the fluorine-based surfactant is not particularly limited, but examples thereof include S-144 and S-145 (manufactured by Asahi Glass Co., Ltd.); FC-170C, FC-430, and FLUORAD-FC4430 (manufactured by Sumitomo 3M Co., Ltd.); FSO, FSO-100, FSN, FSN-100, and FS-300 (manufactured by DUPONT COMPANY LIMITED); and FT-250 and FT-251 (manufactured by NEOS COMPANY LIMITED). These fluorine-based surfactants may be used alone or in combination of two or more kinds thereof.

Examples of the silicone-based surfactant include polysiloxane-based compounds and polyether-modified organosiloxane. The commercially available product of the silicone-based surfactant is not particularly limited, but specific examples thereof include BYK-306, BYK-307, BYK-333, BYK-341, BYK-345, BYK-346, BYK-347, BYK-348, and BYK-349 (all are trade names, manufactured by BYK Japan KK), and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all are trade names, manufactured by Shin-Etsu Chemical Co., Ltd.).

Solvent

The ink composition may further contain a solvent. The solvent is not particularly limited, but examples thereof include an organic solvent and water.

Examples of the water include pure water, such as ion exchange water, ultrafiltration water, reverse osmosis water, and distilled water; and water for removing ionic impurities as much as possible, such as ultrapure water. When water sterilized by ultraviolet irradiation or by the addition of hydrogen peroxide, it is possible to prevent the generation of mold or bacteria in the case of long-term storage of ink. Thus, storage stability tends to be further improved.

Among the organic solvents, a volatile water-soluble organic solvent is more preferable. The organic solvent is not particularly limited, but specific examples thereof include alcohols or glycols, such as glycerin, ethylene glycol, diethylene glycol, triethylene glycol, propylene glycol, dipropylene glycol, 1,3-propanediol, 1,2-butanediol, 1,2-pentanediol, 1,2-hexanediol, 1,4-butanediol, 1,5-pentanediol, 1,6-hexanediol, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol monobutyl ether, diethylene glycol mono-t-butyl ether, propylene glycol monomethyl ether, propylene glycol monoethyl ether, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, dipropylene glycol mono-iso-propyl ether, diethylene glycol dimethyl ether, diethylene glycol diethyl ether, diethylene glycol dibutyl ether, diethylene glycol ethyl methyl ether, diethylene glycol butyl methyl ether, triethylene glycol dimethyl ether, tetraethylene glycol dimethyl ether, dipropylene glycol dimethyl ether, dipropylene glycol diethyl ether, tripropylene glycol dimethyl ether, methanol, ethanol, n-propyl alcohol, iso-propyl alcohol, n-butanol, 2-butanol, tert-butanol, iso-butanol, n-pentanol, 2-pentanol, 3-pentanol, and tert-pentanol; N,N-dimethylformamide; N,N-dimethylacetamide; 2-pyrrolidone; N-methyl-2-pyrrolidone; 2-oxazolidone; 1,3-dimethyl-2-imidazolidinone; dimethyl sulfoxide; sulfolane; and 1,1,3,3-tetramethylurea.

These solvents may be used alone or in combination of two or more kinds thereof. The content of the organic solvent is not particularly limited, and, if necessary, can be appropriately determined. From the viewpoint of improvement in compatibility with the polyoxyethylene alkyl ether, triethylene glycol alkyl ethers such as triethylene glycol monobutyl ether are preferable.

The content of triethylene glycol alkyl ether is preferably 3.0 mass % to 15 mass %, more preferably 3.0 mass % to 12.5 mass %, and further preferably 3.0 mass % to 10 mass %. When the content of triethylene glycol alkyl ether is within the above range, in the ink jet head nozzles, the ejection defect caused by the separation of the surfactant tends to be further suppressed.

The mass ratio of triethylene glycol alkyl ether to polyoxyalkylene alkyl ether is preferably 1.5 or more, more preferably 1.75 or more, and further preferably 2 or more. Further, the upper limit of the mass ratio of triethylene glycol alkyl ether to polyoxyalkylene alkyl ether is not particularly limited, but is preferably 10 or less. When the mass ratio of triethylene glycol alkyl ether to polyoxyalkylene alkyl ether is within the above range, in the ink jet head nozzles, the ejection defect caused by the separation of the surfactant tends to be further suppressed.

pH Adjuster

The ink composition according to the present embodiment may contain a pH adjuster. The pH adjuster can be used to facilitate the adjustment of the pH value of ink. The pH adjuster is not particularly limited, but examples thereof include inorganic acids (for example, sulfuric acid, hydrochloric acid, and nitric acid), inorganic bases (for example, lithium hydroxide, sodium hydroxide, potassium hydroxide, and ammonia), organic bases (for example, triethanolamine, diethanolamine, monoethanolamine, and tripropanolamine), and organic acids (for example, adipic acid, citric acid, and succinic acid). These pH adjusters may be used alone or in combination of two or more kinds thereof.

Other Components

The ink composition according to the present embodiment may contain various kinds of additives, such as a dissolution aid, a viscosity modifier, a pH adjuster, an antioxidant, a preservative, an antifungal agent, a corrosion inhibitor, and a chelating agent for capturing metal ions influencing dispersion, for the purpose of maintaining the storage stability of the ink composition and the ejection stability of the ink composition from a head, preventing the clogging of a nozzle, and preventing the degradation of the ink.

Dynamic Contact Angle

The dynamic contact angle of the ink composition of the present embodiment to a silicon wafer at 100 msec after dropping is 24° or lower, preferably 22° or lower, and more preferably 20° or lower. Further, the dynamic contact angle of the ink composition of the present embodiment to the silicon wafer at 5,100 msec after dropping is 9° or lower, preferably 7° or lower, and more preferably 5° or lower. When the dynamic contact angle of the ink composition to the silicon wafer is within the above range, the filling properties of an ink jet printer is further improved. The dynamic contact angle can be measured by the methods described in Examples.

EXAMPLES

The invention will be described in more detail with reference to Examples and Comparative Examples. The invention is not limited to the following examples.

Materials for Ink Composition

The main materials for the ink composition used in the following examples and comparative examples are as follows.

Dye
  Dye (Y-1-1): refer to below
  Dye (Y-2-1): C.I. Direct Yellow 86
  Dye (Y-2-2): C.I. Direct Yellow 132
  Dye (Y-2-3): C.I. Direct Yellow 142
  Dye (Y-3-1): refer to below

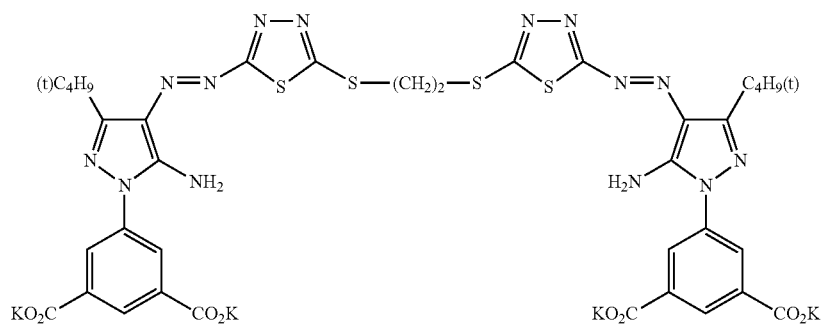

(Y-1-1)

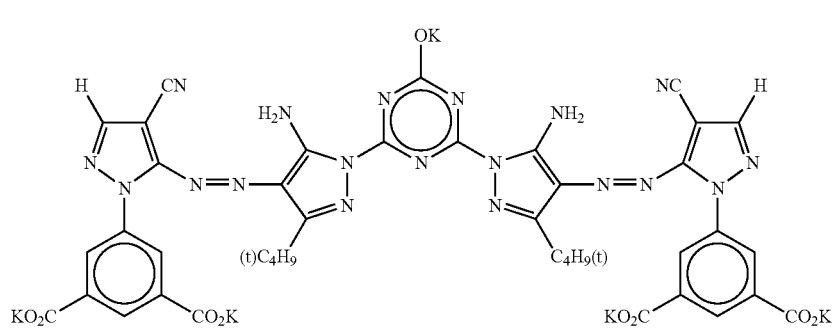

(Y-3-1)

-continued

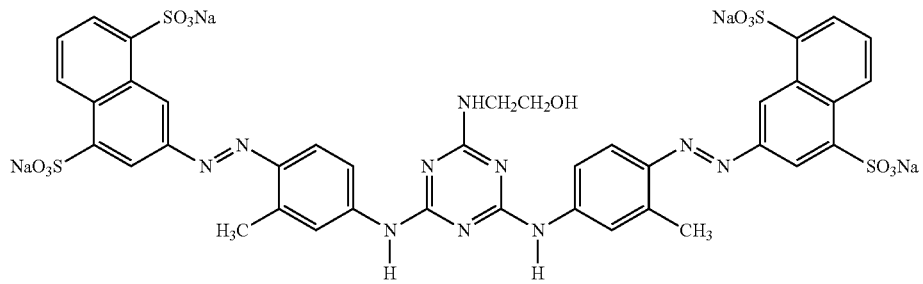

(Y-2-1)

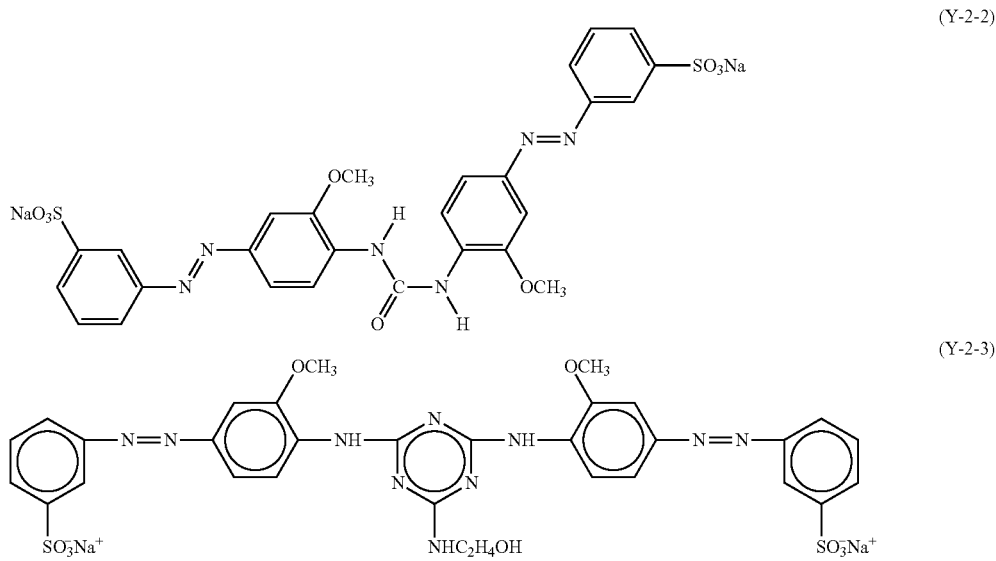

(Y-2-2)

(Y-2-3)

Surfactant

Olfine E1010 (the number of carbon atoms in the main chain: 10, the addition number of moles of ethylene oxide: 10, HLB: 13 to 14, manufactured by Nissin Chemical Industry Co., Ltd.)

Surfynol 465 (the carbon number of main chain: 10, the addition number of moles of ethylene oxide: 10, HLB: 9, manufactured by Air Products and Chemicals, Inc.)

Surfynol 104PG50 (the carbon number of main chain: 10, no ethylene oxide adduct, HLB: 4, manufactured by Air Products and Chemicals, Inc.)

Newcol 1006 (polyoxyalkylene alkyl ether, manufactured by Nippon Nyukazai Co., Ltd.)

Solvent dipropylene glycol-n-propyl ether triethylene glycol monobutyl ether glycerin triethylene glycol pH Adjuster triethanolamine Preparation of Ink Composition Each material was mixed in the composition shown in Table below, and sufficiently stirred to obtain each ink composition. In Table below, the unit of numerical values is mass %, and the total is 100.0 mass %.

Dynamic Contact Angle 0.5 µL of the ink composition was dropped onto a silicon wafer, and the contact angle of the ink composition was measured after 100 msec and 5,100 msec from the time the ink composition was adhered to the silicon wafer. The contact angle thereof was measured using the PCA-1 manufactured by Kyowa Interface Science Co., Ltd. The measurement of the contact angle was performed under conditions of a temperature of 25° C. and a humidity of 50%. Meanwhile, ion exchange water was measured under the measurement condition of dynamic surface tension the same as the measurement condition of ink. As a result, the value of the contact angle of the water to the silicon wafer was 77° at 100 msec, and 75° at 5,100 msec.

TABLE

| | | Examples | | | | | | | | |
|---|---|---|---|---|---|---|---|---|---|---|
| | | 1 | 2 | 3 | 4 | 5 | 6 | 7 | 8 | 9 |
| Dye | Dye (Y-1) | 3.2 | 3.2 | 2.4 | 4.5 | 2.4 | 2.4 | 2.4 | 3.2 | 2.4 |
| | Dye (Y-2-1): C.I. Direct Yellow 86 | 0.8 | | 0.6 | 0.5 | 0.6 | 0.6 | | 0.8 | 0.6 |
| | Dye (Y-2-2): C.I. Direct Yellow 132 | | 0.8 | | | | | | | |

TABLE-continued

|  |  |  |  |  |  |  |  |  |  |
|---|---|---|---|---|---|---|---|---|---|
|  | Dye (Y-2-3): C.I. Direct Yellow 142 |  |  |  |  |  |  | 0.6 |  |
|  | Dye (Y-3) |  |  |  |  | 0.5 | 1.5 | 1.5 |  | 1.0 |
| Surfactant | Olfine E1010 | 0.3 | 0.3 | 0.3 | 0.3 | 0.3 | 0.3 | 0.3 | 0.3 | 0.3 |
|  | Surfynol 465 |  |  |  |  |  |  |  |  |  |
|  | Surfynol 104PG50 | 0.3 | 0.3 | 0.3 | 0.3 | 0.3 | 0.3 | 0.3 | 0.3 | 0.3 |
|  | Newcol 1006 | 3.0 | 3.0 | 3.0 | 3.0 | 3.0 | 3.0 | 3.0 | 3.0 | 3.0 |
| Solvent | Triethylene glycol monobutyl ether | 7.0 | 7.0 | 7.0 | 7.0 | 7.0 | 7.0 | 7.0 | 3.0 | 4.0 |
|  | Glycerin | 10.0 | 10.0 | 10.0 | 10.0 | 10.0 | 10.0 | 10.0 | 10.0 | 10.0 |
|  | Triethylene glycol | 10.0 | 10.0 | 10.0 | 10.0 | 10.0 | 10.0 | 10.0 | 14.0 | 10.0 |
| pH adjuster | Triethanolamine | 0.5 | 0.5 | 0.5 | 0.5 | 0.5 | 0.5 | 0.5 | 0.5 | 0.5 |
| Water |  | balance | balance | balance | balance | balance | balance | balance | balance | balance |
| Total |  | 100 | 100 | 100 | 100 | 100 | 100 | 100 | 100.0 | 100 |
| Dynamic contact angle | Silicon wafer, 100 msec after dropping | 22 | 22 | 22 | 22 | 22 | 22 | 22 | 22 | 22 |
|  | Silicon wafer, 5100 msec after dropping | 7 | 7 | 7 | 7 | 7 | 7 | 7 | 7 | 7 |
| Evaluation results | (Intermittent) printing stability | A | A | A | A | A | A | A | B | B |
|  | Light resistance | B | B | B | B | A | A | B | B | A |
|  | Initial filling properties | A | A | A | A | A | A | A | B | A |

|  |  | Comparative Examples |  |  |  |  |  |  |  |
|---|---|---|---|---|---|---|---|---|---|
|  |  | 1 | 2 | 3 | 4 | 5 | 6 | 7 | 8 |
| Dye | Dye (Y-1) |  |  | 2.0 | 4.0 |  | 2.4 | 2.4 | 2.4 |
|  | Dye (Y-2-1): C.I. Direct Yellow 86 | 4.0 |  | 2.0 |  |  | 0.6 | 0.6 | 0.6 |
|  | Dye (Y-2-2): C.I. Direct Yellow 132 |  | 4.0 |  |  |  |  |  |  |
|  | Dye (Y-2-3): C.I. Direct Yellow 142 |  |  |  |  |  |  |  |  |
|  | Dye (Y-3) |  |  |  |  | 4.0 | 1.0 | 1.0 | 1.0 |
| Surfactant | Olfine E1010 | 0.3 | 0.3 | 0.3 | 0.3 | 0.3 | 0.3 |  |  |
|  | Surfynol 465 |  |  |  |  |  |  |  | 4.0 |
|  | Surfynol 104PG50 | 0.3 | 0.3 | 0.3 | 0.3 | 0.3 | 0.3 |  |  |
|  | Newcol 1006 | 3.0 | 3.0 | 3.0 | 3.0 | 3.0 |  | 3.0 |  |
| Solvent | Triethylene glycol monobutyl ether | 7.0 | 7.0 | 7.0 | 7.0 | 7.0 | 7.0 | 7.0 | 18.0 |
|  | Glycerin | 10.0 | 10.0 | 10.0 | 10.0 | 10.0 | 10.0 | 10.0 | 10.0 |
|  | Triethylene glycol | 10.0 | 10.0 | 10.0 | 10.0 | 10.0 | 10.0 | 10.0 | 10.0 |
| pH adjuster | Triethanolamine | 0.5 | 0.5 | 0.5 | 0.5 | 0.5 | 0.5 | 0.5 | 0.5 |
| Water |  | balance | balance | balance | balance | balance | balance | balance | balance |
| Total |  | 100 | 100 | 100 | 100 | 100 | 100 | 100 | 100 |
| Dynamic contact angle | Silicon wafer, 100 msec after dropping | 22 | 22 | 22 | 22 | 22 | 27 | 25 | 27 |
|  | Silicon wafer, 5100 msec after dropping | 7 | 7 | 7 | 7 | 7 | 13 | 10 | 13 |
| Evaluation results | (Intermittent) printing stability | A | A | A | C | C | A | A | A |
|  | Light resistance | C | C | C | B | A | A | A | A |
|  | Initial filling properties | A | A | A | A | A | C | C | C |

Light Resistance

The ink jet printer EP-805A (manufactured by Seiko Epson Corp.) was filled with the ink composition. A solid image adjusted such that OD values are 0.5, 1.0, 1.5, and 2.0 was printed on photo paper <gloss> (manufactured by Seiko Epson Corp.), thereby creating records, respectively.

The OD value (D0) of the obtained record was measured using a reflection densitometer (trade name: Spectrolino, manufactured by Gretag Inc.). Thereafter, the record was exposed using a xenon weather meter (trade name: XL75S, manufactured by Suga Test Instruments Co., Ltd.) for 6 days, 12 days, and 18 days under conditions of a temperature of 23° C., a relative humidity (RH) of 50%, and an illuminance of 75 klux. After the exposure, the OD value (D) of the exposed record was measured using a reflection densitometer (trade name: Spectrolino, manufactured by Gretag Inc.), optical density residual rate (ROD) was obtained by the following equation, and light resistance was evaluated according to the following criteria.

$$ROD(\%) = (D/D0) \times 100$$

Measurement condition: no light source filter, light source: D50, viewing angle: 2°

Evaluation Criteria

A: ROD of all records is 70% or more even after exposure for 18 days.

B: ROD of all records is 70% or more even after exposure for 12 days, but ROD is less than 70% after exposure for 18 days.

C: ROD of all records is 70% or more even after exposure for 6 days, but ROD is less than 70% after exposure for 12 days.

D: ROD of all records is less than 70% after exposure for 6 days.

Initial Filling Properties

The ink cartridge of ink jet printer EP-805A (manufactured by Seiko Epson Corp.) was filled with each of the prepared ink sets. The initial filling operation to a head was carried out according to the initial filling sequence established by the EP-805A. Thereafter, nozzle checking was carried out in order to confirm whether ink can be discharged from all the nozzles of the head. When nozzles unable to discharge ink exist, head cleaning (suction of ink in the nozzle) was carried out, and then the nozzle checking was carried out again. Based on the number of times of cleaning required to discharge ink from all the nozzles, initial filling properties were evaluated according to the following evaluation criteria.

Evaluation Criteria

A: ink is discharged from all the nozzles by only the initial filling sequence.

B: the number of times of cleaning required to discharge ink from all the nozzles is one time.

C: the number of times of cleaning required to discharge ink from all the nozzles is two or more times.

(Intermittent) Printing Stability

After whether the ink can be discharged from all the nozzles was confirmed according to the above "evaluation of initial filling properties", a vertical rule line pattern was printed in parallel to the paper feed direction of the ink jet printer using a head operation sequence program for evaluation, and (intermittent) printing stability was evaluated according to the following evaluation criteria.

Test environment: Rh of 25% at 40° C.

Head operation sequence for evaluation: the head was reciprocated for 40 seconds in a head main scanning direction in a state in which the ink was not discharged, and then ink blanking (flushing) was repeated five times, and then two rule lines were printed.

Evaluation Criteria

A: Rule lines are normally printed both first time and second time (visual observation).

B: Rule lines are normally printed first time or second time (visual observation).

C: Rule lines are not normally printed both first time and second time (visual observation).

The entire disclosure of Japanese Patent Application No. 2014-225371, filed Nov. 5, 2014 is expressly incorporated by reference herein.

What is claimed is:

1. An ink composition, comprising:
a dye (Y-1) represented by a formula below;
a dye (Y-2) selected from the group consisting of C.I. Direct Yellows 86, 132, and 142; and
a polyoxyakylene alkyl ether,
wherein a content ratio A of the dye (Y-1) and the dye (Y-2) (the dye (Y-1):the dye (Y-2)) is 7:3 to 9.5:0.5,
a content of the dye (Y-1) is 2.0 mass % to 5.0 mass %, and
a dynamic contact angle of the composition to a silicon wafer is 24° or lower at 100 msec after dropping, and is 9° or lower at 5,100 msec after dropping,

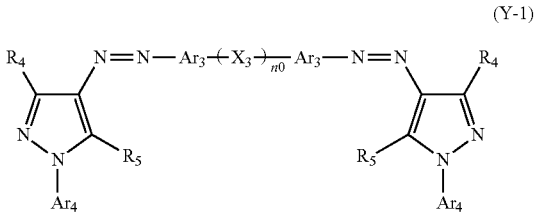

(Y-1)

wherein in Formula (Y-1), $R_4$ represents a substituent, $R_5$ represents $-OR_6$ or $-NHR_7$, each of $R_6$ and $R_7$ represents a hydrogen atom or a substituent, $X_3$ represents a divalent linking group, n0 is 0 or 1, $Ar_3$ represents a divalent heterocyclic group, and $Ar_4$ represents an alkyl group, an aryl group, or a triazine group.

2. The ink composition according to claim 1, wherein a content of the dye (Y-2) is 0.10 mass % to 1.0 mass %.

3. The ink composition according to claim 1, comprising a dye (Y-3) represented by a formula below, wherein a content of the dye (Y-3) is 0.50 mass % to 1.5 mass %,

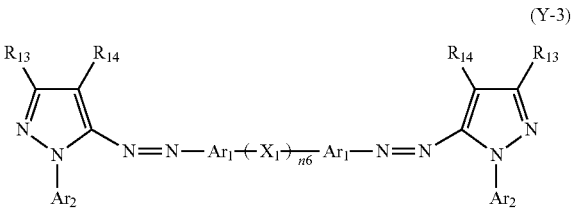

(Y-3)

wherein in Formula (Y-3), $R_{13}$'s each independently represent a hydrogen atom or a substituent, $R_{14}$'s each independently represent $-OR_{16}$, $-NHR_{17}$, or a cyano group, each of $R_{16}$ and $R_{17}$ represents a hydrogen atom or a substituent, $X_1$ represents a substituted or unsubstituted aryl group or a substituted or unsubstituted triazine group, n6 is 0 or 1, $Ar_1$'s each independently represent a divalent heterocyclic group, and $Ar_2$'s each independently represent a substituted or unsubstituted alkyl group, a substituted or unsubstituted aryl group, or a substituted or unsubstituted triazine group.

4. The ink composition according to claim 1, comprising triethylene glycol alkyl ether.

5. The ink composition according to claim 4, wherein a mass ratio of the triethylene glycol alkyl ether to the polyoxyalkylene alkyl ether is 2 or more.

6. The ink composition according to claim 1, wherein a content of the polyoxyalkylene alkyl ether is 1.0 mass % to 5.0 mass %.

7. The ink composition according to claim 4, wherein a content of the triethylene glycol alkyl ether is 3.0 mass % to 15 mass %.

8. The ink composition according to claim 4, wherein the triethylene glycol alkyl ether includes triethylene glycol monobutyl ether.

9. An ink composition, comprising:
a dye (Y-1) represented by a formula below;
a dye (Y-2) selected from the group consisting of C.I. Direct Yellows 86, 132, and 142;

an alkylene oxide adduct of an acetylene glycol having a main chain of 12 or more carbon atoms; and
an acetylene glycol having a main chain of 10 or more carbon atoms,
wherein a content ratio A of the dye (Y-1) and the dye (Y-2)(Y-1):the dye (y-2)is 7:3to 9.5:0.5,
acontent of the dye (Y-1) is 2.0 mass %, and
a dynamic contact angle of the composition to a silcon wafer is 24° or lower at 100 msec after dropping, and is 9° or lower at 5,100 msec dropping,

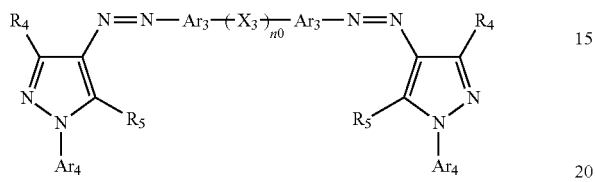
(Y-1)

wherein in Formula (Y-1), $R_4$ represents a substituent, $R_5$ represents —$OR_6$ or —$NHR_7$, each of $R_6$ and $R_7$ represents a hydrgen atom or a substituent, $X_3$ represents a divalent linking group, n0 is 0 or 1, $Ar_3$ represents a divalent heterocyclic group, and $Ar_4$ represents an alkyl group, an aryl group, or a triazine group.

* * * * *